(12) United States Patent
Thorpe

(10) Patent No.: US 12,280,849 B2
(45) Date of Patent: Apr. 22, 2025

(54) BELT DRIVE PEDAL CYCLE WITH SIDE MOUNTED WHEELS, CANTILEVER CHAIN STAY AND BELT TENSIONER

(71) Applicant: Karbon Kinetics Limited, Chessington (GB)

(72) Inventor: Richard Thorpe, Thames Ditton (GB)

(73) Assignee: Karbon Kinetics LLC, Chessington (GB)

( * ) Notice: Subject to any disclaimer, the term of this patent is extended or adjusted under 35 U.S.C. 154(b) by 566 days.

(21) Appl. No.: 17/591,726

(22) Filed: Feb. 3, 2022

(65) Prior Publication Data

US 2022/0153379 A1     May 19, 2022

Related U.S. Application Data

(63) Continuation of application No. PCT/GB2020/051876, filed on Aug. 6, 2020.

(30) Foreign Application Priority Data

Aug. 6, 2019 (GB) ........................................ 1911221

(51) Int. Cl.
    *B62M 9/16*      (2006.01)
    *B60B 1/00*      (2006.01)
    (Continued)

(52) U.S. Cl.
    CPC .............. *B62K 19/30* (2013.01); *B60B 1/003* (2013.01); *B60B 1/0269* (2013.01);
    (Continued)

(58) Field of Classification Search
    CPC .............................. B62M 9/16; B62K 25/005
    See application file for complete search history.

(56) References Cited

U.S. PATENT DOCUMENTS 4,170,369 A * 10/1979 Strutman ............... B62K 21/02
    188/26
5,667,233 A * 9/1997 Metzinger ................ B62L 1/00
    280/238

(Continued)

FOREIGN PATENT DOCUMENTS

| DE | 19840576 | 3/2000 |
|---|---|---|
| EP | 0650886 | 5/1995 |

(Continued)

OTHER PUBLICATIONS

UKIPO, Search Report dated Jan. 15, 2020, in GB1911221.8, 1 pg.

(Continued)

*Primary Examiner* — James A English
*Assistant Examiner* — Hosam Shabara
(74) *Attorney, Agent, or Firm* — Henry Patent Law Firm PLLC

(57) ABSTRACT

A pedal driven cycle comprising a cantilevered frame member coupled to a power input sprocket and a driven sprocket; a belt drive connecting the power input sprocket to the driven sprocket; and a side mounted rear wheel releasably coupled to a multi-speed gear hub that is coaxial with the side mounted rear wheel, wherein the multi-speed gear hub is coupled to the driven sprocket.

36 Claims, 18 Drawing Sheets

(51) Int. Cl.
  *B60B 1/02* (2006.01)
  *B60B 27/02* (2006.01)
  *B62K 15/00* (2006.01)
  *B62K 19/30* (2006.01)
  *B62K 25/28* (2006.01)

(52) U.S. Cl.
  CPC .......... *B60B 27/023* (2013.01); *B62K 15/006* (2013.01); *B62K 25/28* (2013.01); *B62M 9/16* (2013.01)

(56) References Cited

U.S. PATENT DOCUMENTS

| | | | |
|---|---|---|---|
| 8,998,236 B2* | 4/2015 | Trimble | B62K 25/286 |
| | | | 280/281.1 |
| 9,150,272 B1* | 10/2015 | Thompson | B62M 6/45 |
| 2005/0217914 A1* | 10/2005 | Sugimoto | B62K 25/32 |
| | | | 280/260 |
| 2006/0108858 A1 | 5/2006 | Mercat et al. | |
| 2007/0035106 A1* | 2/2007 | Thorpe | B60B 27/023 |
| | | | 280/260 |
| 2009/0236819 A1 | 9/2009 | Scurlock | |
| 2018/0050758 A1 | 2/2018 | Pfeiffer | |
| 2018/0065704 A1 | 3/2018 | Choi et al. | |
| 2022/0106002 A1* | 4/2022 | Montague | B62J 45/00 |

FOREIGN PATENT DOCUMENTS

| | | | |
|---|---|---|---|
| EP | 1842769 | 10/2007 | |
| EP | 3100939 | 12/2016 | |
| GB | 2400084 | 10/2004 | |
| JP | 63184585 | 7/1988 | |
| JP | 63240486 | 10/1988 | |
| WO | 2007088275 | 8/2007 | |
| WO | 2012103185 | 8/2012 | |
| WO | 2019086064 | 5/2019 | |
| WO | WO-2019086064 A1 * | 5/2019 | ............ B62K 19/34 |
| WO | 2021023992 | 2/2021 | |

OTHER PUBLICATIONS

WIPO, International Search Report and Written Opinion mailed Apr. 11, 2020, in PCT/GB2020/051876, 12 pgs.

CNIPA, Office Action issued in Application No. 202080069984.2 on Nov. 21, 2024, 8 pages.

* cited by examiner

BELT DRIVE PEDAL CYCLE WITH SIDE MOUNTED WHEELS, CANTILEVER CHAIN STAY AND BELT TENSIONER

CROSS-REFERENCE TO RELATED APPLICATIONS

This application is a continuation of PCT/GB2020/051876 filed Aug. 6, 2020, which claims priority to GB 1911221.8, filed Aug. 6, 2019, the disclosures of which are hereby incorporated by reference.

BACKGROUND

The vast majority of pedal driven cycles, bicycles for example, employ a metallic linked roller type chain to transmit power input by the rider through the pedal cranks to the rear wheel. The advantages of roller chains are well known and include being highly efficient, durable, compact and relatively low cost. Other advantages of the linked roller type chain are that they are able to operate efficiently over a wide range of tension between the sprockets as well as being highly flexible laterally and thus are able to be used in combination with well understood multi-speed derailleur gearing systems. However, bicycle roller chains have certain disadvantages such as requiring oil lubrication to run efficiently and also to prevent corrosion and rust. Over time, the lubrication will diminish through usage and weather conditions such as rain at which point, unless the chain is re-lubricated, the chain will rust or corrode and will tend to produce more noise even to the point of squeaking. Oil lubrication can collect dirt which can spoil the rider's clothing, living spaces, and skin. Another problem with linked roller type chains is tendency for the rider's clothing to become trapped or drawn into the interface between the teeth of the driven and driving sprockets and the chain.

In order to address the drawback of an oily chain spoiling the rider's clothing, living spaces, and skin as well as preventing rain or dirt from collecting on the chain and to prevent the rider's clothes from becoming trapped between the chain and sprockets, designers have employed so called chain covers to cover and enclose the entire chain drive. These protective chain covers have been used for nearly 100 years and are well known. A key attribute that designers of protective chain covers must consider is to provide sufficient clearance between the inside of the cover and the chain in order that the chain during normal operation does not contact the protective chain cover which will result in unacceptable noise such as a clanking or rattling sound. The width and height of the chain is of critical importance as it determines the minimum size and shape of the protective chain cover. Most generally accepted as a key practical and commercial benefit and desirable is that the protective chain cover is designed to be as small and compact as possible so as not to protrude beyond the outer chain perimeter when viewed from the side. Protective chain covers must also allow access to the chain for replacement or service and therefore they are usually comprised of an inner and an outer half that join together generally on the centreline of the chain when viewed from the top of the bicycle. The joint of the two protective chain halves will also generally have an overlap to keep out water and keep in oil. This overlapped has the drawback of essentially doubling the thickness of the protective chain cover wall section and therefore the protective chain cover is required to be even larger beyond the outer perimeter of the chain drive when viewed from the side. Some protective chain covers are only focused on preventing the rider's clothes from becoming trapped in the chain and sprockets and thus only cover the area of the chain towards the driving sprocket and pedal crank assembly. These covers are also generally only comprised of a singular outer protective chain cover.

There have been many attempts over the past 50 years to address the drawbacks of the bicycle roller chain by employing a non-metallic toothed belt drive instead of the traditional metallic linked roller type chain. Toothed belt drives have been successfully used in car engine timing applications, medical fields, as well as the food processing industry. A key advantage of a toothed belt drive is that it does not require any lubrication and therefore they do not spoil the rider's clothing, skin, or living spaces. Another advantage of toothed belt drives is that they produce less noise than metallic roller chains. Toothed belt drives are made in one continuous un-ended loop and do not have links and are made of multiple types of materials such as rubber imbedded with high strength fibres to transmit power such as nylon, carbon, or aramid for example. This means that toothed belt drives are manufactured in specific lengths and require a mechanism for adjusting the tension of the belt when fitted to joining the belt sprockets being driven. The flexibility, weight, and power transmission capability of belt drives has improved dramatically over the past decade to a point that toothed belt drives are now able to approach the efficiency of a bicycle linked roller chain and increasingly more pedal operable cycles are being fitted with belt drives.

However, with regards to the field of pedal operated cycles such as bicycles, belt drives have certain drawbacks when compared to linked roller chains. In order to operate efficiently, belt drives must operate within a narrow tolerance of tension and alignment such that all bicycle frames need to have a mechanism for adjusting the tension of the belt as the belt wears in over its life and the bicycle frame must be robust enough to resist twisting that could cause the belt to perform unreliably or have a shortened service life span. Adjustment mechanisms are well known and understood and are usually of the so called eccentric bottom bracket type or the so called horizontal slotted rear drop out type. A noticeable drawback of the eccentric bottom bracket type adjustment is that the axis of the front driving sprocket varies in position vertically as well as fore and aft. This can cause alignment issues where vertical space constraints exist along the upper and lower belt lines. These two methods of adjusting belt tension are most widely used and the tension is varied simply by lengthening or shorting the distance between the axis of the pedal input driving sprocket and the axis of the rear wheel driven sprocket. Other less common types of belt drive tension adjustment are the well-known so called idler pulley system such as found on car timing belt applications. Generally, tension of the belt is adjusted occasionally over many hundreds of miles of usage.

Another drawback of belt drives compared to linked roller type chains is that they are wider. This can prove problematic for designers in that the critical so called "chain line" of the bicycle requires careful consideration in order to have sufficient clearance between the belt and the rear tyre, the frame, pedal cranks, and gear components and also be positioned for ergonomic and efficient, comfortable pedal crank operation.

Belt drives are not suitable for multi-speed derailleur gearing systems due to the fact that they are not laterally compliant, they are of fixed length, and require precise tension to operate efficiently. Thus all belt driven pedal cycles are restricted to single speed systems or employ well understood multispeed rear internal hub gear systems or front pedal crank located internal gearing systems, such as the German made Pinion™ branded bicycle gearbox. These internal gearing systems operate with a constant and fixed so called "chain line".

Bicycles fitted with a belt drive have an additional complication and drawback relating to fixing a flat tyre on the rear driven wheel because removal of the rear wheel requires release and re-adjustment of the belt tension during the process. While well understood, this process of re-adjustment of belt tension and wheel alignment is complex and time consuming.

Belt drives also suffer from the same problem as linked roller chains of the possibility for the rider's clothing to become trapped between the belt and the sprockets. Whilst the popularity of belt drives is increasing, designers have not widely addressed this key drawback by adding a protective belt cover. The main reason for this is that due to the greater width of the belt compared to the linked roller chain, a protective belt drive cover of the traditional design variety used on linked roller chain bicycle becomes too large and bulky to be commercially appealing. The need to join the cover with an overlap joint further increases the size of the cover and has the drawback of trapping water within the cover. Furthermore, joined up enclosed covers can resonate more noise than open covers. Additionally, because the accepted best practice for maintaining and adjusting critical belt tension is by means of the well-known eccentric bottom bracket adjustment or horizontal slotted rear dropout adjustment, which changes the distance from the axis of the front driving pedal crank sprocket and the axis of the rear driven wheel sprocket, even more clearance must be designed into the protective belt cover in order to account for the maximum possible centre distance of the sprockets and still provide adequate clearance between the belt and the inside of the protective belt cover. This results in an even larger protective belt cover than traditional protective chain covers and is generally accepted as undesirable to the rider, being visually bulky and unappealing, adding undesirable cost, and adding undesirable weight.

Within the field of belt drive bicycles, the vast majority of these bicycles employ frame designs that facilitate rotatable fixing of the front and rear wheels such that the wheel is attached to the bicycle frame usually with a forked frame member at two fixing points, one on each side of non-rotating hub axel. The main reason designers opt for dual side mounted rear wheel on belt drive bicycles is that this arrangement provides for well-known fitting of traditional bicycle planetary hub gearing systems and also provides sufficient stiffness to resist twisting of the rear wheel axis for the belt drive to operate reliably. For example, a recommended 0.3 degrees of maximum rear axle twist is allowable by the well know Gates™ brand of bicycle belt drives.

Traditional dual side mounted wheel bicycle frames have the drawback of not allowing a flat tyre to be fixed while the wheel remains fitted to the bicycle. In order to effectively access the tyre and inner tube, or replace a tyre and inner tube, the wheel must be detached from the bicycle frame. Detaching the front wheel on a traditional dual side mounted wheel bicycle frame is relatively straight forward using the well-known and understood so called quick release skewer and usually does not involve getting grease on the user's hands. However, detaching the rear wheel of a dual side mounted wheel bicycle is usually a much more complex, messy, and cumbersome operation resulting in soiling of the user's hands or clothing with oil or dirt from the rear derailleur gearing and chain system. There is the added complication of ensuring the braking system is released in order to remove the wheel and then re-adjusted safely after the wheel is re-fitted to the frame. On traditional dual side mounted wheel bicycle frames that employ a rear wheel bicycle planetary style multi speed gear hub there is the added complication of the user needing to adjust the chain or belt tension usually with so called "horizontal rear dropouts" or an eccentric bottom bracket adjustment arrangement.

When it comes to dual side mounted wheel frame designs that have a traditional diamond frame arrangement for the rear wheel frame triangle and that are designed to operate with a belt drive system instead of a roller link chain, the frame for the rear wheel requires the ability to be separated or split in an area of the rear triangle in order for the belt, which is not separable like a roller link chain, to be removed from and fitted to the front pedal crank assembly and the rear wheel sprocket.

A further disadvantage of dual side mounted wheel frame designs is apparent when fitted to folding type bicycles that have folding hinge mechanisms that position the front and the rear wheel in a co-axial configuration when folded. The dual side mounted wheel frame increases the width of the folded bicycle across this folded wheel axis making the folded bicycle package envelope larger and more bulky which is un-desirable.

Some attempts have been made to combine the advantages of a belt drive bicycle and single side mounted wheels. A well-known example is the Strida™ folding bicycle. While some Strida™ bicycle models have a multispeed planetary gearing system mounted coaxial with the pedal crank assembly axis, they are mostly all single speed in configuration and none have a multispeed planetary gearing system mounted coaxial with the rear wheel. The drawbacks of multispeed planetary gearing system mounted coaxial with the pedal crank assembly axis are high cost, high weight, and with the exception of the Pinion$^{SM}$ gear system, limited gearing of two or three gears with limited total gearing ratios of usually less than 200%. Strida$^{SM}$ bicycles feature a well-known and understood eccentric bottom bracket arrangement in order to adjust the belt tension. The Strida$^{SM}$ rear frame configuration is of a non-cantilevered triangulated arrangement—essentially one side of a traditional rear triangle of a traditional diamond tube bicycle frame. Whilst the configuration offers efficient positioning of rear wheel assembly vertically and longitudinally, the drawback of the Strida™ non-cantilevered rear frame configuration is that it has very low torsional stiffness and lateral stiffness. This is due to the relatively small cross sectional area of the Strida™ rear triangle frame structural tube members.

SUMMARY OF THE INVENTION

According to an aspect, there is a pedal driven cycle comprising: a cantilevered frame member coupled to a power input sprocket and a driven sprocket; a belt drive connecting the power input sprocket to the driven sprocket; a side mounted rear wheel releasably coupled to a multi-speed gear hub that is coaxial with the side mounted rear wheel, wherein the multi-speed gear hub is coupled to the driven sprocket; and a tension adjustment mechanism coupling the driven sprocket to the cantilevered frame member, the tension adjustment mechanism being slidably moveable along at least a part of the cantilevered frame member thereby to adjust a tension in the belt drive and comprising a first member and a second member, wherein the first and second members are arranged on opposing sides of the cantilevered frame member and clamped to the cantilevered frame member.

A novel and inventive solution to this problem of combining the benefits of a belt drive system, a multi-speed planetary hub gear mounted co-axial with the rear wheel axis and single side mounted wheels is a unique bicycle design employing a rear single sided cantilevered frame member with a new and novel means of adjusting belt tension, having a structurally optimal shape for maximising torsional and lateral stiffness, and a means for mounting a multi-speed bicycle planetary hub gear co-axial with the rear wheel axis with a single side mounted rear wheel.

By the phrase "side mounted" we intend to mean mounted on a single side, such as only on a single side.

The innovative new design of the rear single sided cantilevered frame member employs a shape that substantially follows the upper and lower belt lines in close proximity in order to protect the rider from trapping their clothes or body parts between the belt and sprockets. A unique feature of the invention is the cross sectional shape of the rear single sided cantilevered frame member being maximised (i.e. at its greatest) as it passes through the vertical plane intersected by the pedal crank assembly, the upper and lower belt lines, and the rear wheel assembly in order to produce optimal stiffness and strength characteristics whilst still maintaining minimum gap clearance between said parts.

The invention allows free access to the wheel and tyre providing easy access for fixing flat tyres without the need to remove the wheel from the bicycle frame, eliminating the need to release and re-adjust the belt tension and re-align the rear driving wheel. The invention also allows for the rear wheel to be removed without needing to affect or re-adjust the belt tension. The invention also allows the belt to be fitted or replaced without the requirement of the frame to have a separable link or joint feature.

A preferred embodiment of the invention comprises the rear single sided cantilevered frame member uniformly part of a forward frame member having a monolithic structure of similar material type constructed preferably using the well-known and understood composite fibre resin moulding process. Similarly, the invention could have a monolithic structure of similar material type constructed using the methods such as the well-known and understood aluminium hydroforming and welding process or constructed in generally two halves vertically and connected together using bolts or other fasteners or seam welded. The construction method could be of the well-known and understood metal injection or die casting process or metal forming or pressing process. The invention is shown including single side mounted wheel having a unique monolithic cantilevered spoke design in order to accommodate with sufficient clearance a rear disk braking system and the means for rotatably mounting a multi-speed planetary hub gear mounted co-axial with the rear wheel axis.

The invention employs a novel means to adjust the tension of the belt which comprises ideally an arrangement of an adjustment screw for setting belt tension and a clamping arrangement of a torque arm and a rear hub gear main bearing housing held fast to the rear single sided cantilevered frame member by torque arm housing fixing bolts.

An alternative embodiment of the invention comprises a slotted rear single sided cantilevered frame member with a shape that substantially follows the upper and lower belt lines and extends fore and aft to the front and rear sprockets whilst providing sufficient clearance in order to protect the users clothing or body parts from becoming trapped between the belt and sprocket. The cross sectional shape of the slotted rear single sided cantilevered frame member as it passes through the vertical plane intersected by the pedal crank assembly, the upper and lower belt lines, and the rear wheel assembly could include a variation to further enhance the overlap of the belt in order to raise the level of protection from entrapment of clothing or body parts between the belt and sprocket.

A further alternative embodiment of the invention comprises the rear single sided cantilevered rear frame member pivotally mounted to a front frame member and controlled with a springing member to provide suspension of the rear wheel and afford the rider higher levels of comfort.

A further embodiment of the invention provides for the rear single sided cantilevered rear frame member to be connected to a forward frame member with a well-known and understood folding hinge assembly to allow the invention to be folded into a more compact size for easy storage or transportation, said folding hinge assembly being positioned such that after folding of the invention, the front wheel assembly axis and the rear wheel assembly axis are substantially coaxially positioned.

A further embodiment of the invention comprises a rear single sided cantilevered rear frame member having a pedal crank motor assembly of the well-known and understood electric machine variety capable of transmitting torque and power from the rear single sided cantilevered rear frame member to the pedal crank assembly.

A yet further embodiment of the invention comprises a front motor assembly mounted coaxially with the front wheel assembly. Said front motor assembly is of the well-known and understood electric machine variety employing a planetary reduction gearing system having a unique and novel fitting arrangement adapted to a single side mounted front wheel assembly.

At least a portion of the cantilevered frame member may be offset from a fore-aft centreline of the pedal driven cycle.

The pedal driven cycle may further comprise a gear hub housing coupled to the cantilevered frame member retaining the multi-speed gear hub between the rear wheel and the belt drive such that the belt drive is removable without removing the side mounted rear wheel and the side mounted rear wheel is removable without removing or adjusting the belt drive.

The multi-speed gear hub may be retained in the gear hub housing by one or more bearings.

The multi-speed gear hub may be a planetary gear hub.

The pedal driven cycle may further comprise a torque arm for transmitting torque from the multi-speed gear hub to the cantilevered frame member.

The tension adjustment mechanism may be adjustable by means of one or more adjustment screws.

The first member may comprise an adjustment screw.

Additionally or alternatively, the second member may comprise an adjustment screw.

The second member may be the torque arm.

The cantilevered frame member may comprise slots to receive the tension adjustment mechanism.

The pedal cycle may further comprise an eccentric bottom bracket tension adjustment system.

The cantilevered frame member may be shaped to curve around the tyre of the side mounted rear wheel.

The primary structural load path of the cantilevered frame member may be in the plane intersected by the belt drive.

A cross sectional area of the cantilevered frame member may maximised (i.e. greatest) in the plane intersected by the belt drive.

The cross sectional area of the cantilevered frame member in a plane perpendicular to the fore-aft centreline of the pedal drive cycle may be maximised (i.e. greatest) at the point of least clearance to the side mounted rear wheel.

A clearance between a tyre of the side mounted rear wheel and the cantilevered frame member may be between 2 mm and 15 mm.

A clearance between the cantilevered frame member and a pedal crank assembly of the pedal drive cycle may be between 2 mm and 15 mm.

The cantilevered frame member may have a side profile that substantially coincides with a side profile of the belt drive along at least a portion of its length of travel.

A clearance between the cantilevered frame member and the belt drive may be between 0.5 mm and 12 mm along at least a major portion of a length of travel of the belt drive.

The cantilevered frame member may comprise a lip protruding in a plane perpendicular to an axis of the side mounted rear wheel, wherein the lip is adjacent to a first side edge of the belt drive.

The pedal driven cycle may further comprise a second lip protruding in a plane perpendicular to the axis of the side mounted rear wheel, wherein the second lip may be adjacent to a second side edge of the belt drive.

The cantilevered frame member may be pivotally coupled to a forward frame member of the pedal driven cycle.

The pedal driven cycle may further comprise a springing member connected to the cantilevered frame member and the forward frame member to provide suspension of the rear wheel.

The gear hub may be arranged to receive a brake rotor.

The side mounted rear wheel may comprise cantilevered spokes. The cantilevered spokes may be formed from a monolithic material. Additionally or alternatively, the spokes may be curved such that the rim of the side mounted rear wheel is aligned with a centreline of the pedal driven cycle and a hub of the side mounted rear wheel is offset from the centreline of the pedal driven cycle. The spokes may be non-triangulated spokes.

The pedal driven cycle may further comprise a motor able to transmit torque to a pedal crank assembly.

The pedal driven cycle may further comprise a motor mounted coaxial with a wheel. The motor may be mounted coaxial with the front wheel.

The pedal driven cycle may further comprise a hinge for folding the pedal driven cycle.

The belt drive may be a non-metal belt drive.

There may be only a single driving sprocket, and/or there may be only a single driven sprocket. The belt drive may only pass round the driving sprocket and the driven sprocket. This means there may be no jockey wheel or roller/rotatable tensioning device

BRIEF DESCRIPTION OF DRAWINGS

Examples of the present invention will now be described in detail with reference to the accompanying drawings, in which.

DETAILED DESCRIPTION

Figure 1:
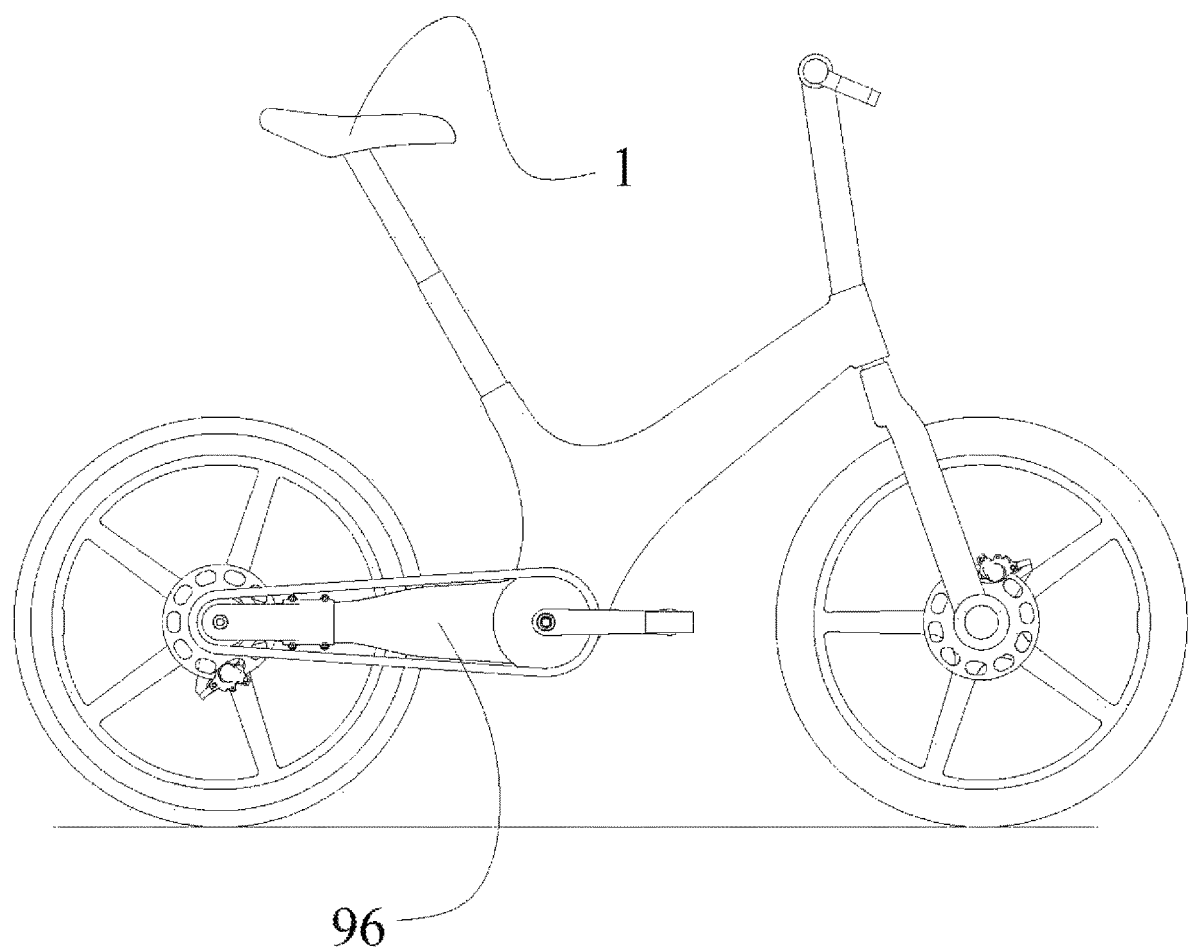
FIG. 1 shows a side view of a belt drive bicycle with side mounted wheels.

FIG. 1 shows a first embodiment comprising a belt driven bicycle 1 with side mounted wheels with a side mounted belt drive rear wheel frame system 96.

Figure 2:
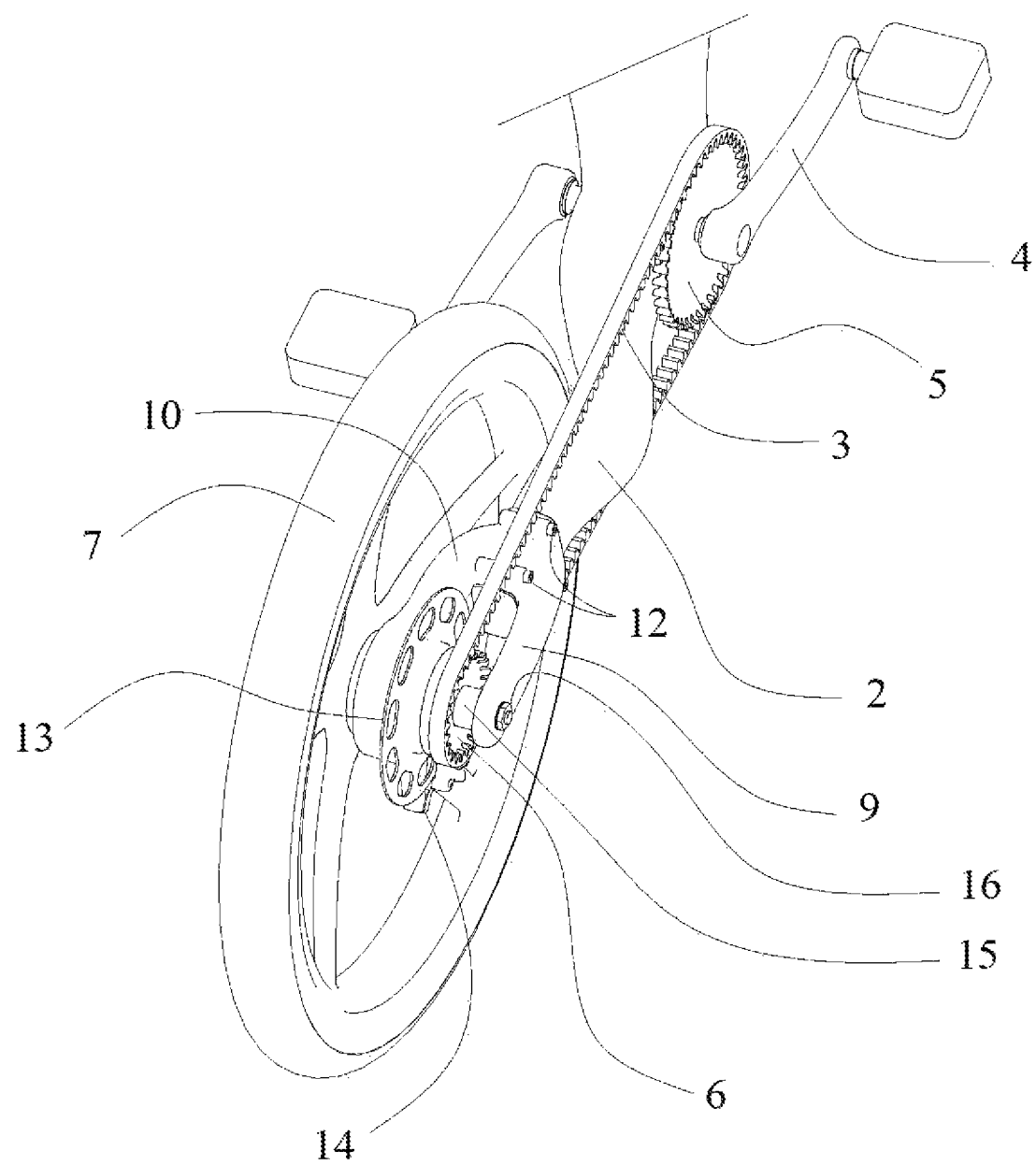
FIG. 2 shows a perspective view of the side mounted belt drive rear wheel frame system of the belt driven bicycle of FIG. 1.

As shown in the perspective view of FIG. 2, the illustrated embodiment comprises a pedal crank assembly 4 having a front sprocket 5 to engage with a belt 3 and rotatably mounted to a rear single sided cantilevered frame member 2. The rear single sided cantilevered frame member 2 is formed to receive a torque arm 9 and a rear hub gear main bearing housing 10 that are clamped rigidly by torque arm housing fixing bolts 12. The torque arm 9 is formed to receive a multi speed bicycle planetary hub gear assembly 15 which is fastened to the torque arm 9 by a hub gear torque fastener 16 such that torque resulting from rotational input of rear sprocket 6 and reacted through the multi speed bicycle planetary hub gear assembly 15 and rear single side mounted wheel assembly 7 is transferred from the multi speed bicycle planetary hub gear assembly 15 to the torque arm 9. The rear hub gear main bearing housing 10 is formed to allow rotatable mounting of the multi speed bicycle planetary hub gear assembly 15. Attached to the multi speed bicycle planetary hub gear assembly 15 at one side is a rear single side mounted wheel assembly 7. The multi speed bicycle planetary hub gear assembly 15 is formed to receive a rear disk rotor 13 to engage with a rear disk brake calliper 14 in order to provide braking of the rear single side mounted wheel assembly 7.

Figure 3:
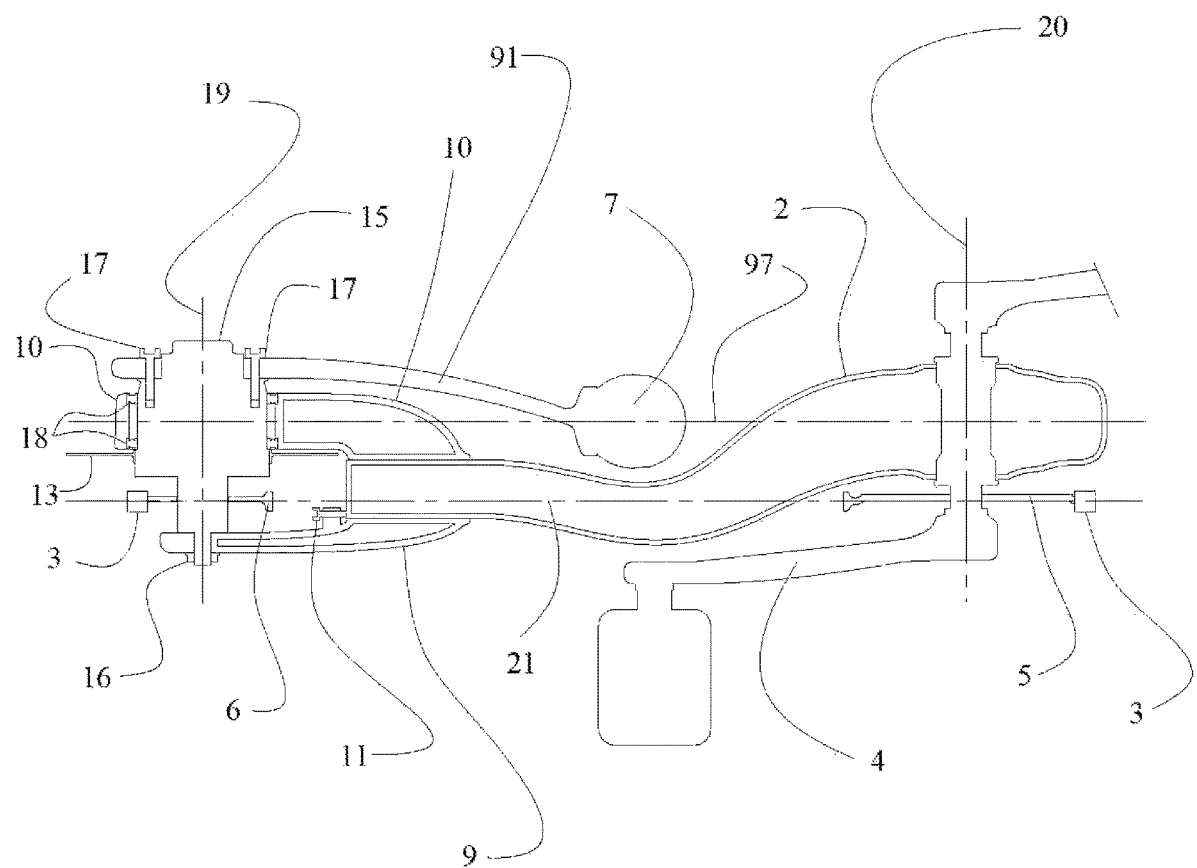
FIG. 3 shows a top view cross section of the side mounted belt drive rear wheel frame system.

As shown in FIG. 3, the torque arm 9 has a fixing for a belt tension adjustment bolt 11 in order to tension the belt 3 during adjustment. When the belt tension adjustment bolt 11 is turned, the rear hub gear main bearing housing 10 and torque arm 9 will be moved relative to the rear single sided cantilevered frame member 2 and will alter the distance between the rear wheel rotation axis 19 and pedal crank assembly rotation axis 20 thus affecting the tension in the belt 3. After adjusting the tension in the belt 3, the torque arm 9 and the rear hub gear main bearing housing 10 can be rigidly clamped to the rear single sided cantilevered frame member 2 with the torque arm housing fixing bolts 12. The rear hub gear main bearing housing 10 is formed to receive multi speed bicycle planetary hub gear assembly main bearings 18 that interface to the multi speed bicycle planetary hub gear assembly 15 in order to allow rotation of the multi speed bicycle planetary hub gear assembly 15 around the rear wheel rotation axis 19 and relative to the rear hub gear main bearing housing 10. The arrangement of the multi speed bicycle planetary hub gear assembly main bearings 18 could include only one bearing or a number of bearings and could be of the deep groove ball, needle, or angular contact variety. The multi speed bicycle planetary hub gear assembly 15 is formed for rigid mounting of the rear single side mounted wheel assembly 7 with a rear wheel assembly fastener 17 such that torque from multi speed bicycle planetary hub gear assembly 15 transmitted to rear single side mounted wheel assembly 7 by either rear disk rotor 13 or hub gear torque fastener 16 will not result in the rear single side mounted wheel assembly 7 coming loose from the multi speed bicycle planetary hub gear assembly 15. The arrangement of the attachment of the rear single side mounted wheel assembly 7 to the multi speed bicycle planetary hub gear assembly 15 could also be of a threaded or splined variety or pinned or formed as a uniform continuous part such as by plastic injection over-moulding or fusing or bonding of the rear single side mounted wheel assembly 7 to the multi speed bicycle planetary hub gear assembly 15. The rear single side mounted wheel assembly 7 has a cantilevered wheel spoke 91 shaped in a substantially cantilevered arrangement in order to facilitate space for the rear hub gear main bearing housing 10 and the rear disk rotor 13. The nature of construction of the rear hub gear main bearing housing 10 and torque arm 9 could be metal or composite moulded or investment cast or cast or CNC machined. The rear single sided cantilevered frame member 2 is shaped to extend rearward from the pedal crank assembly rotation axis 20 and pass to one side of the bicycle centreline 97 between the rear single side mounted wheel assembly 7 and the pedal crank assembly 4 in a way such that minimum clearance between the tyre of the rear single side mounted wheel assembly 7 and the rear single sided cantilevered frame member 2 and between the rear single sided cantilevered frame member 2 and the pedal crank assembly 4 is observed in order to maximise the structural stiffness of the rear single sided cantilevered frame member 2. The minimum clearance between the tyre of the rear single side mounted wheel assembly 7 and the rear single sided cantilevered frame member 2 and between the rear single sided cantilevered frame member 2 and the pedal crank assembly 4 is between 2 and 15 mm. The rear single sided cantilevered frame member 2 could also be formed such that the torque arm 9 and rear hub gear main bearing housing 10 are integrally and rigidly glued or joined homogeneously as one unit and able to receive a well-known and understood eccentric bottom bracket for fitting of the pedal crank assembly 4 in order to adjust the tension of the belt 3.

Figure 4:
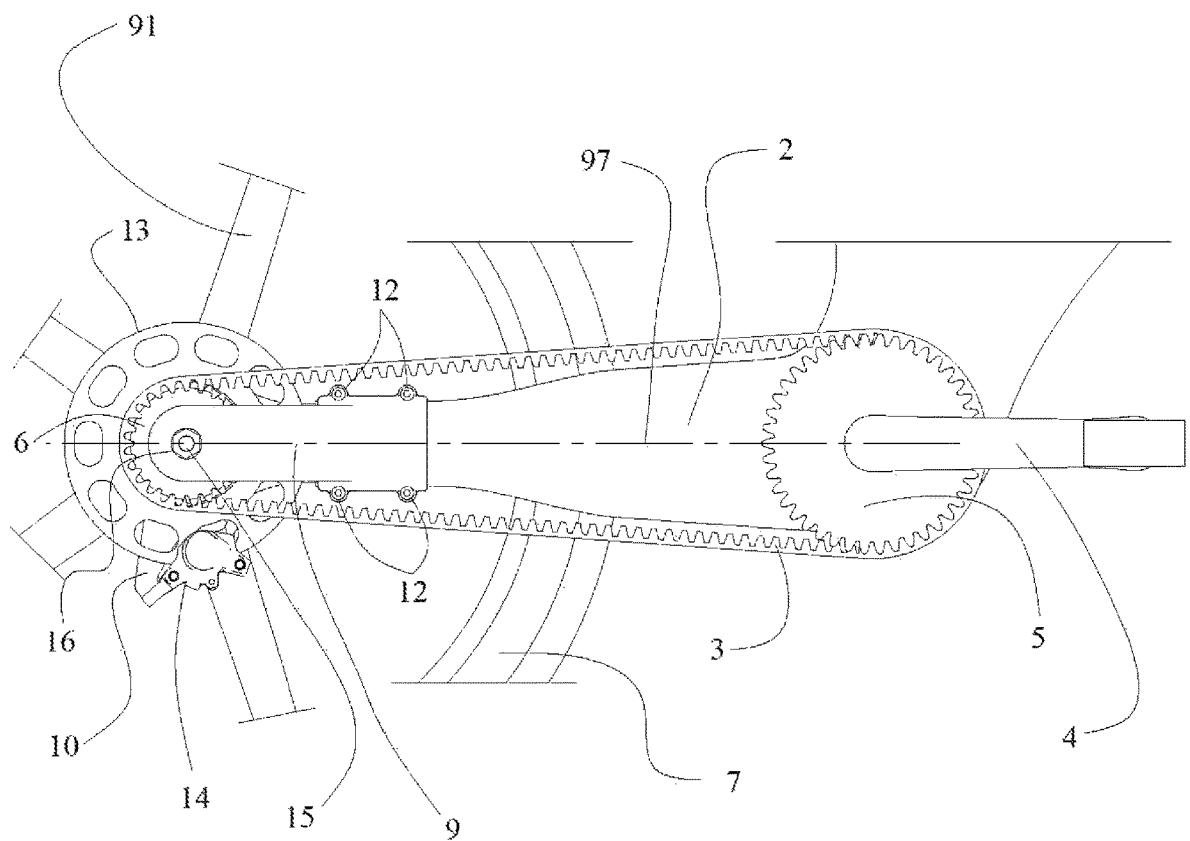
FIG. 4 shows a side view of the side mounted belt drive rear wheel frame system.

FIG. 4 shows a right side view of the illustrated embodiment comprising a pedal crank assembly 4 having a front sprocket 5 to engage with the belt 3 and rotatably mounted to the rear single sided cantilevered frame member 2. The shape of the rear single sided cantilevered frame member 2 can be seen to be contained within the perimeter of the belt 3, with the primary structural load path going between the upper and lower belt runs. The cantilevered frame member 2 is shaped with a profile that substantially matches that of the belt 3 for a portion of the belt 3 in order to maximise the cross sectional area of the cantilevered frame member 2 in the plane intersected by the upper and lower runs of the belt 3.

The nature of the shape of the rear single sided cantilevered frame member 2 as it mates to the torque arm 9 can be seen to be generally parallel to the torque arm 9 and parallel to the bicycle centreline 97 such that if the torque arm housing fixing bolts 12 are loosened, the torque arm 9 can slide relative to rear single sided cantilevered frame member 2 such that the distance between the rear sprocket 6 and the front sprocket 5 will be altered in order to change the tension in the belt 3. The rear hub gear main bearing housing 10 is shown having a feature for rigid mounting of rear disk brake calliper 14 to rear hub gear main bearing housing 10.

Figure 5:
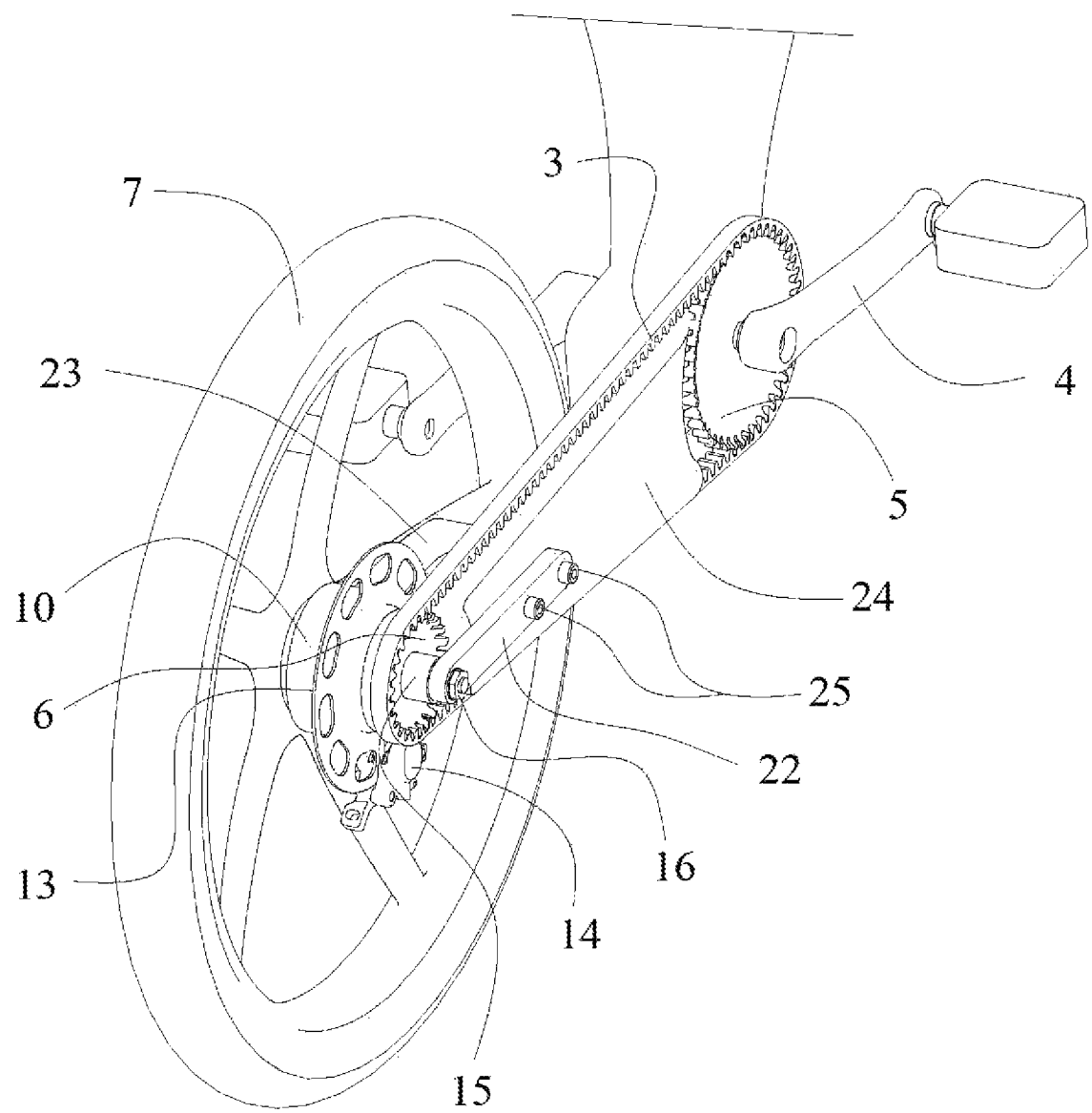
FIG. 5 shows a perspective view of an alternative embodiment of the side mounted belt drive rear wheel frame system with a slotted rear single sided cantilevered frame member.

FIG. 5 is a perspective view of an alternative embodiment. The alternative embodiment has a pedal crank assembly 4 having a front sprocket 5 to engage with a belt 3 and rotatably mounted to a slotted rear single sided cantilevered frame member 24. The slotted rear single sided cantilevered frame member 24 is formed to receive a slotted torque arm 22 and a slotted rear hub gear main bearing housing 23 that are clamped rigidly to the slotted rear single sided cantilevered frame member 24 by slotted belt tension fasteners 25. The slotted torque arm 22 is formed to receive a multi speed bicycle planetary hub gear assembly 15 which is fastened to the slotted torque arm 22 by a hub gear torque fastener 16 such that torque resulting from rotational input of rear sprocket 6 and reacted through the multi speed bicycle planetary hub gear assembly 15 and rear single side mounted wheel assembly 7 is transferred from the multi speed bicycle planetary hub gear assembly 15 to the slotted torque arm 22. The slotted rear hub gear main bearing housing 23 is formed to allow rotatable mounting of the multi speed bicycle planetary hub gear assembly 15. Attached to the multi speed bicycle planetary hub gear assembly 15 at one side is a rear single side mounted wheel assembly 7. The multi speed bicycle planetary hub gear assembly 15 is formed to receive a rear disk rotor 13 to engage with a rear disk brake calliper 14 in order to provide braking of the rear single side mounted wheel assembly 7.

Figure 6:
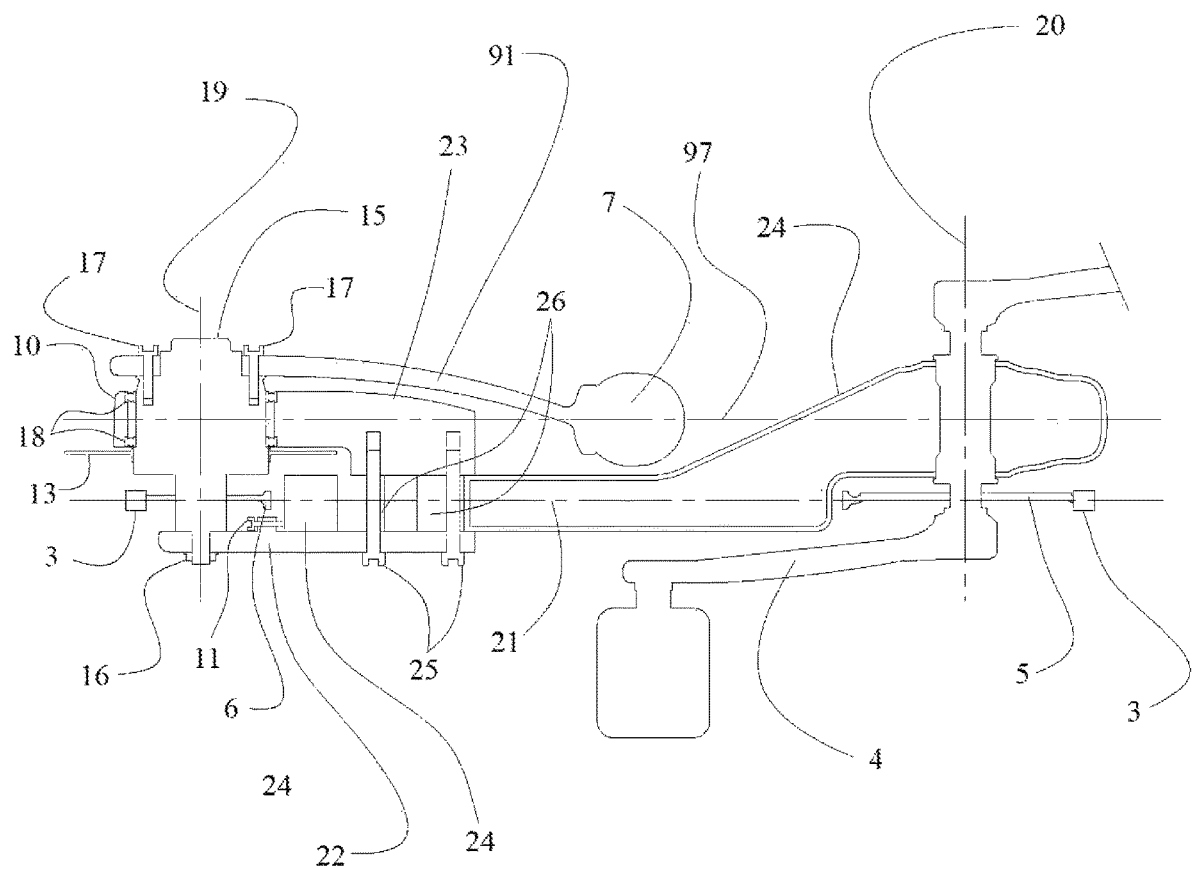
FIG. 6 shows a top view cross section of the alternative embodiment of the side mounted belt drive rear wheel frame system with a slotted rear single sided cantilevered frame member.

As shown in FIG. 6, the slotted torque arm 22 has a fixing for a belt tension adjustment bolt 11 in order to tension the belt 3 during adjustment. After the slotted belt tension fasteners 25 are loosened, the belt tension adjustment bolt 11 can be turned in order to move the slotted torque arm 22 and slotted rear hub gear main bearing housing 23 relative to the slotted rear single sided cantilevered frame member 24 through the belt tension adjustment slot 26 to change the distance between the rear wheel rotation axis 19 and the pedal crank assembly rotation axis 20, thus affecting the tension in belt 3. After adjusting the tension in the belt 3, the slotted torque arm 22 and the slotted rear hub gear main bearing housing 23 can be rigidly clamped to the slotted rear single sided cantilevered frame member 24 by tightening the slotted belt tension fasteners 25. The slotted rear hub gear main bearing housing 23 is formed to receive the multi speed bicycle planetary hub gear assembly main bearing 18 that interfaces to the multi speed bicycle planetary hub gear assembly 15 in order to allow rotation of the multi speed bicycle planetary hub gear assembly 15 around the rear wheel rotation axis 19 and relative to the slotted rear hub gear main bearing housing 23. The arrangement of multi speed bicycle planetary hub gear assembly main bearing 18 could include only one bearing 18 or a number of bearings 18 and could be of the deep groove ball, needle, or angular contact variety. The multi speed bicycle planetary hub gear assembly 15 is formed for rigid mounting of the rear single side mounted wheel assembly 7 with a rear wheel assembly fastener 17 such that torque from the multi speed bicycle planetary hub gear assembly 15 transmitted to the rear single side mounted wheel assembly 7 by either the rear disk rotor 13 or the hub gear torque fastener 16 will not result in the rear single side mounted wheel assembly 7 becoming loose from the multi speed bicycle planetary hub gear assembly 15. The arrangement of the attachment of the rear single side mounted wheel assembly 7 to the multi speed bicycle planetary hub gear assembly 15 could also be of a threaded or splined variety or pinned or formed as a uniform continuous part such as by plastic injection over-moulding or fusing or bonding of the rear single side mounted wheel assembly 7 to the multi speed bicycle planetary hub gear assembly 15. The rear single side mounted wheel assembly 7 has a cantilevered wheel spoke 91 shaped in a substantially cantilevered arrangement in order to facilitate space for the slotted rear hub gear main bearing housing 23 and the rear disk rotor 13. The nature of construction of the slotted torque arm 22 and the slotted rear hub gear main bearing housing 23 could be metal or composite moulded or investment cast or cast or CNC machined. The slotted rear single sided cantilevered frame member 24 is shaped to extend rearward from the pedal crank assembly rotation axis 20 and pass to one side of the bicycle centreline 97 between the rear single side mounted wheel assembly 7 and the pedal crank assembly 4 in a way such that minimum clearance between the tyre of the rear single side mounted wheel assembly 7 and the slotted rear single sided cantilevered frame member 24 and between the slotted rear single sided cantilevered frame member 24 and the pedal crank assembly 4 is observed in order to maximise the structural stiffness of the slotted rear single sided cantilevered frame member 24. The minimum clearance between the tyre of the rear single side mounted wheel assembly 7 and the rear single sided cantilevered frame member 2 and between the rear single sided cantilevered frame member 2 and the pedal crank assembly 4 is between 2 and 15 mm.

Figure 7:
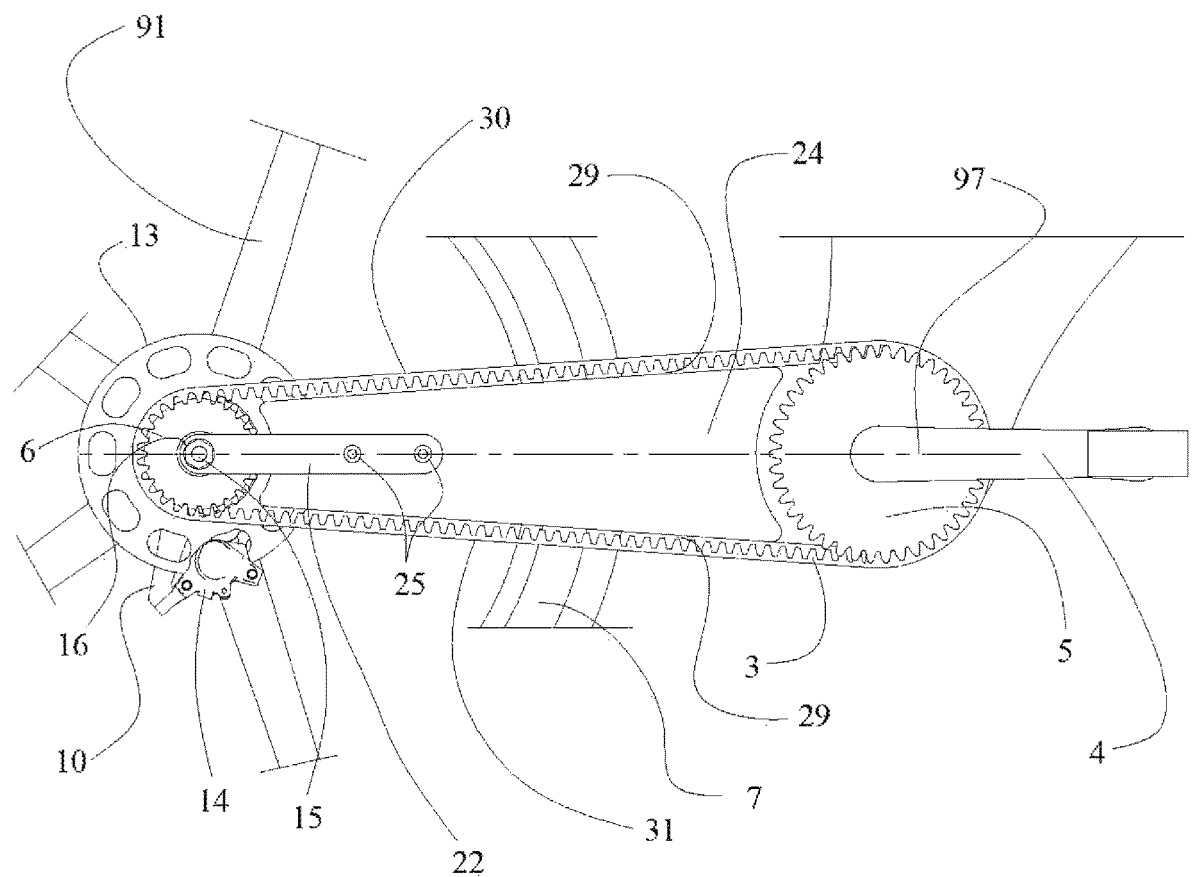
FIG. 7 shows a side view of the alternative embodiment of the side mounted belt drive rear wheel frame system with a slotted rear single sided cantilevered frame member.

FIG. 7 shows a right side view of the alternative embodiment. The shape of the slotted rear single sided cantilevered frame member 24 can be seen to be contained within the perimeter of the belt 3 with the primary structural load path going between the upper and lower belt runs. The cantilevered frame member 24 has a shape that closely follows the belt 3 with a minimum belt clearance gap 29 in order to lessen the risk of the rider's clothing or body parts becoming trapped between the belt 3 and the slotted rear single sided cantilevered frame member 24 and between the belt 3 and the front sprocket 5 and between the belt 3 and the rear sprocket 6. This shape also maximises the cross sectional area of the cantilevered frame member 24 in the plane intersected by the upper and lower runs of the belt 3. The size of the belt clearance gap 29 could range from 0.5 to 12 mm. The shape of slotted rear single sided cantilevered frame member 24 could also follow closely the shape of the front sprocket 5 and the shape of the rear sprocket 6 in order to prevent the rider's clothing or body parts from becoming trapped between the slotted rear single sided cantilevered frame member 24 and the front sprocket 5 and the slotted rear single sided cantilevered frame member 24 and the rear sprocket 6. The nature of the interface of the slotted rear single sided cantilevered frame member 24 as it mates to the slotted torque arm 22 is generally parallel to the bicycle centreline 97 such that if the slotted belt tension fasteners 25 are loosened, the slotted torque arm 22 can slide relative to the slotted rear single sided cantilevered frame member 24 such that the distance between the rear sprocket 6 and the front sprocket 5 will be altered in order to change the tension in the belt 3. The rear hub gear main bearing housing 10 is shown having a feature for rigid mounting of the rear disk brake calliper 14 to the rear hub gear main bearing housing 10.

Figure 8:
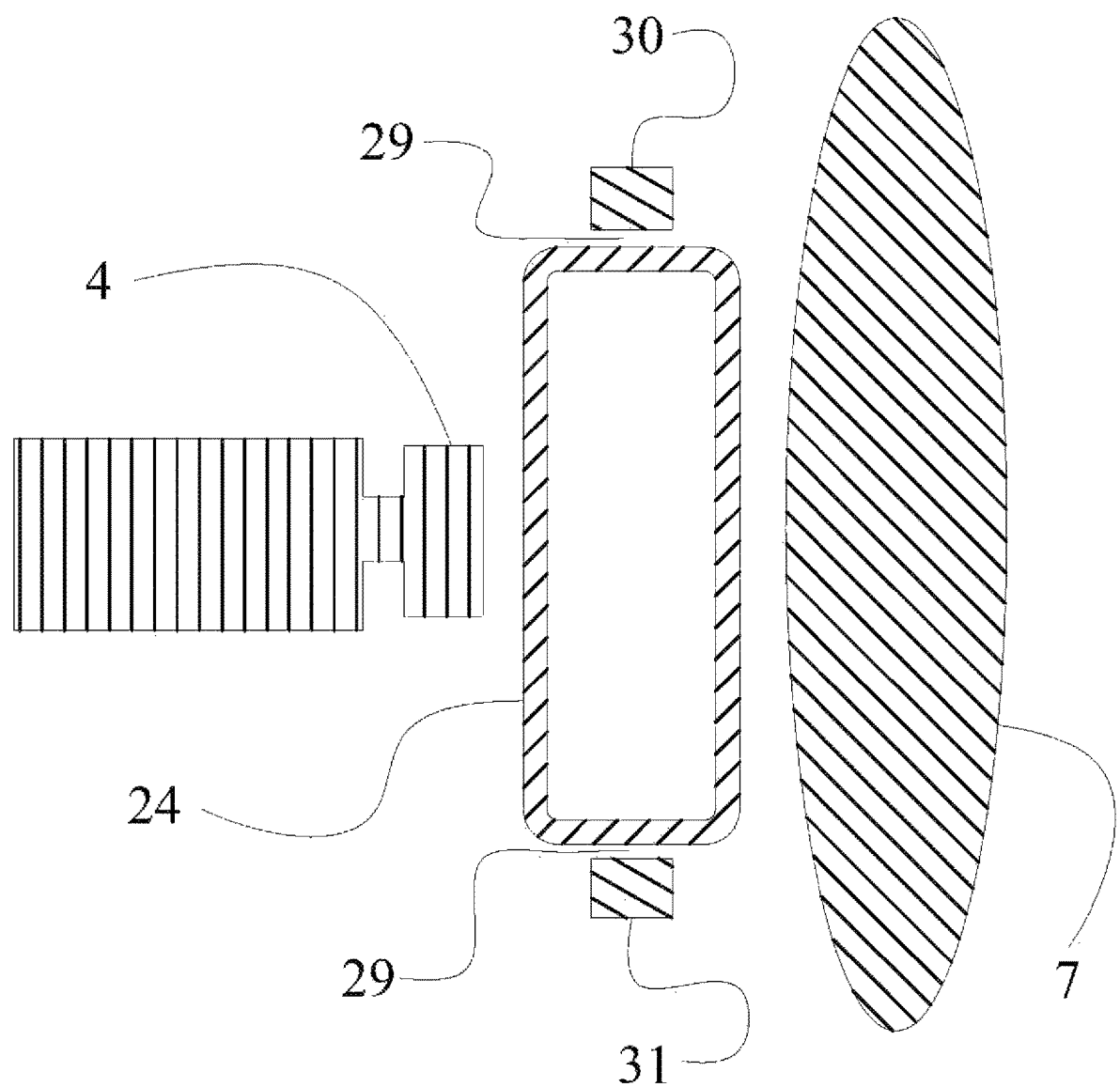
FIG. 8 shows a vertical front cross section view taken through the point of least clearance between the rear tyre and the slotted rear single sided cantilevered frame member.

FIG. 8 shows a vertical front cross section view taken through the point of least clearance between the tyre of the rear single side mounted wheel assembly 7 and the slotted rear single sided cantilevered frame member 24. The shape of the slotted rear single sided cantilevered frame member 24 is maximised such that there is minimum clearance between the pedal crank assembly 4 and the slotted rear single sided cantilevered frame member 24 and the tyre of the rear single side mounted wheel assembly 7 and the slotted rear single sided cantilevered frame member 24 and the upper belt 30 and the slotted rear single sided cantilevered frame member 24 and the lower belt 31 and the slotted rear single sided cantilevered frame member 24. The belt clearance gap 29 could be from 0.5 to 12 mm. The shape of the slotted rear single sided cantilevered frame member 24 is optimised to provide a high degree of rotational stiffness within the constraints of upper belt 30, lower belt 31, pedal crank assembly 4 and rear single side mounted wheel assembly 7.

Figure 9:
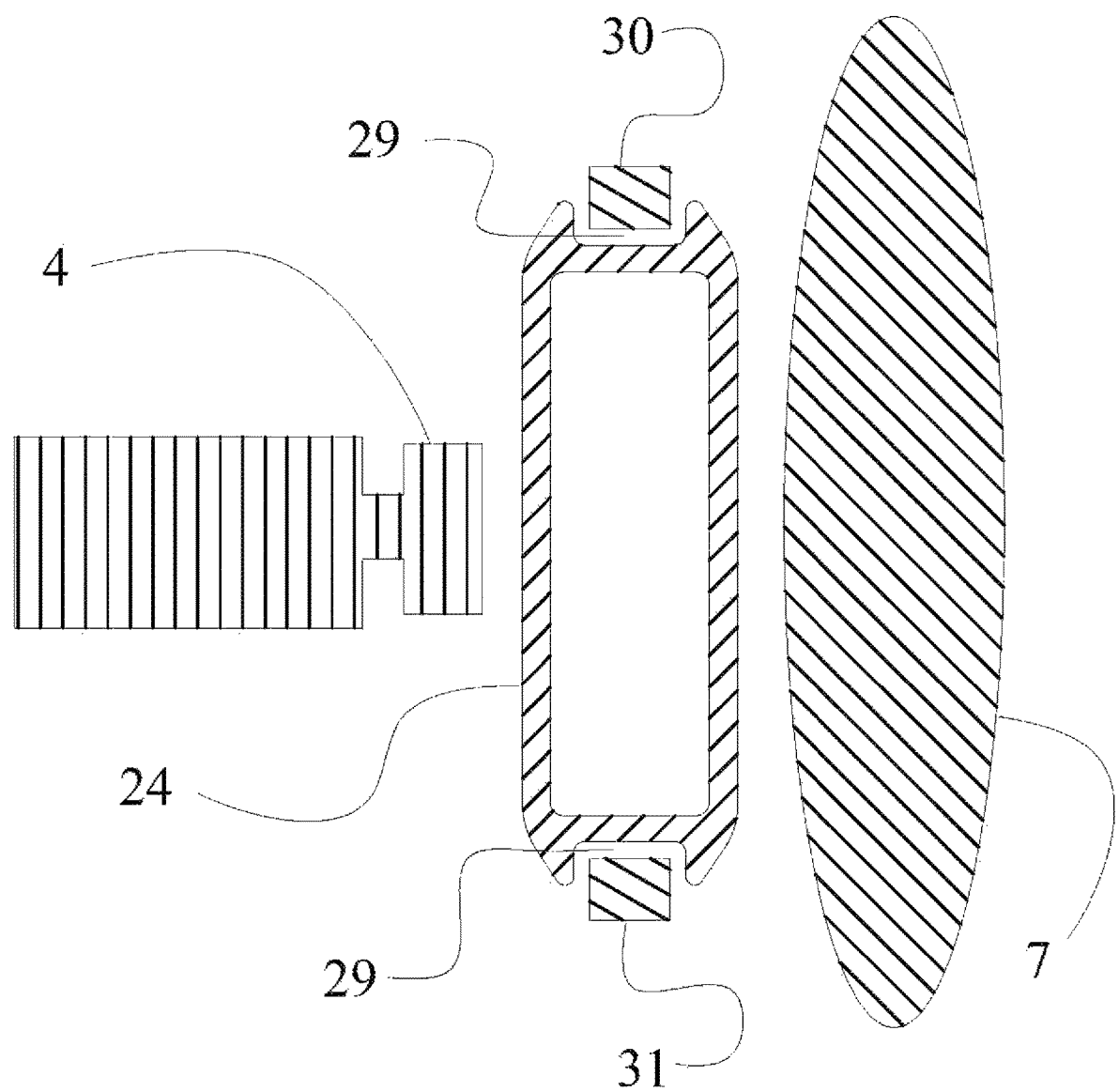
FIG. 9 shows a vertical front cross section view of another alternative embodiment taken through the point of least clearance between the rear tyre and the slotted rear single sided cantilevered frame member.

FIG. 9 shows a vertical front cross section view of a further alternative embodiment of the slotted rear single sided cantilevered frame member 24 taken through the point of least clearance between the tyre of the rear single side mounted wheel assembly 7 and the slotted rear single sided cantilevered frame member 24. The shape of the slotted rear single sided cantilevered frame member 24 is formed to partially overlap the upper belt 30 and the lower belt 31 in order to provide protection of the rider's clothes or body parts from becoming trapped between upper belt 30 and slotted rear single sided cantilevered frame member 24 and lower belt 31 and slotted rear single sided cantilevered frame member 24. The slotted shape in the cantilevered frame member is provided by a lip protruding in a plane perpendicular to an axis of the side mounted rear wheel (this lip is adjacent to a first side edge of the belt drive), and a second lip protruding in a plane perpendicular to the axis of the side mounted rear wheel, the second lip being adjacent to a second side edge of the belt drive.

Figure 10:
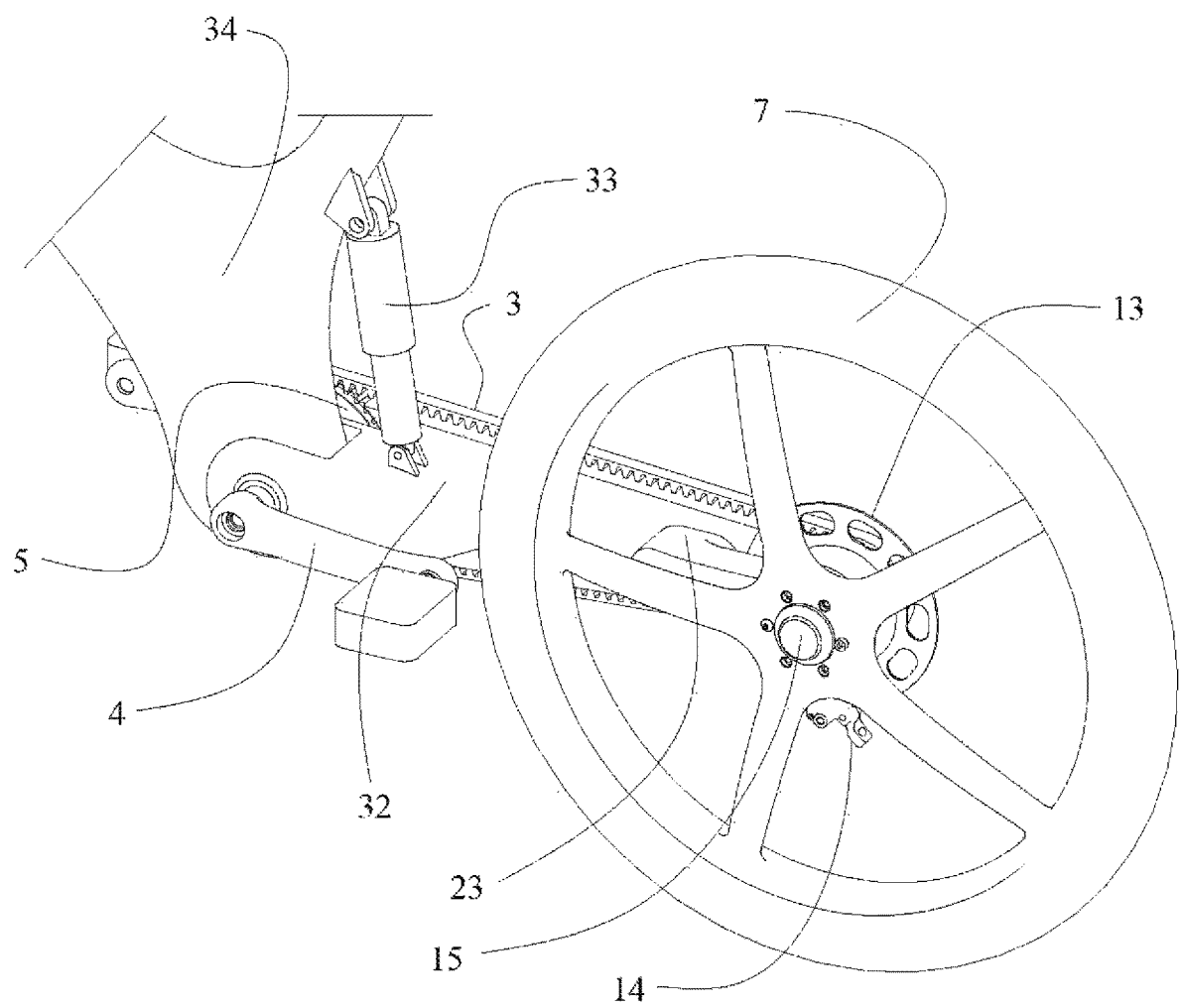
FIG. 10 shows a perspective view of a further alternative embodiment of the side mounted belt drive rear wheel frame system with a pivoting rear single sided cantilevered frame member.

FIG. 10 is another alternative embodiment comprising a pedal crank assembly 4 having a front sprocket 5 to engage with a belt 3 and rotatably mounted to a pivoting rear single sided cantilevered frame member 32. The pivoting rear single sided cantilevered frame member 32 is formed to receive a slotted rear hub gear main bearing housing 23 which is formed to allow rotatable mounting of a multi speed bicycle planetary hub gear assembly 15. Attached to the multi speed bicycle planetary hub gear assembly 15 at one side is a rear single side mounted wheel assembly 7. The multi speed bicycle planetary hub gear assembly 15 is formed to receive a rear disk rotor 13 to engage with rear disk brake calliper 14 in order to provide braking of rear single side mounted wheel assembly 7. The pivoting rear single sided cantilevered frame member 32 is pivotally mounted to suspension front frame 34 through bushings or bearings and with a shock absorber 33 in order to control movement of pivoting rear single sided cantilevered frame member 32 with respect to suspension front frame 34. The purpose of this alternative embodiment is to provide suspension and a higher degree of comfort from the rider.

Figure 11:
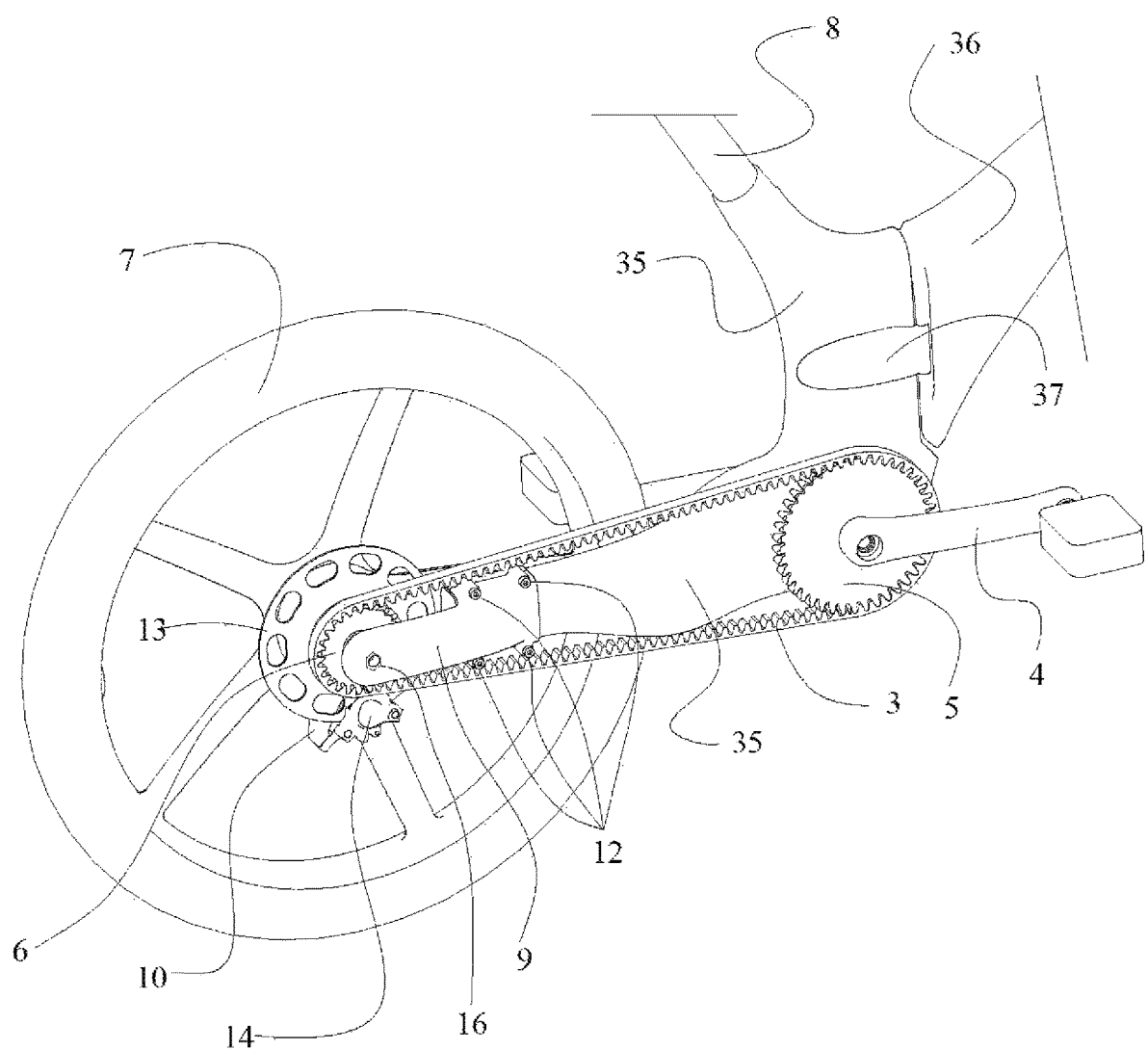
FIG. 11 shows a perspective view of an embodiment of a folding bicycle with a rear single sided cantilevered frame member.

FIG. 11 is a further alternative embodiment comprising a pedal crank assembly 4 having a front sprocket 5 to engage with a belt 3 and rotatably mounted to a folding rear single sided cantilevered frame member 35. The folding rear single sided cantilevered frame member 35 is formed to receive a torque arm 9 and a rear hub gear main bearing housing 10 that are clamped rigidly by torque arm housing fixing bolt 12. The torque arm 9 is formed to receive a multi speed bicycle planetary hub gear assembly 15 which is fastened to the torque arm 9 by hub gear torque fastener 16 such that torque resulting from rotational input of rear sprocket 6 and reacted through the gearings of the multi speed bicycle planetary hub gear assembly 15 and the rear single side mounted wheel assembly 7 is transferred from the multi speed bicycle planetary hub gear assembly 15 to the torque arm 9. The rear hub gear main bearing housing 10 is formed to allow rotatable mounting of the multi speed bicycle planetary hub gear assembly 15. Attached to the multi speed bicycle planetary hub gear assembly 15 at one side is a rear single side mounted wheel assembly 7. The multi speed bicycle planetary hub gear assembly 15 is formed to receive a rear disk rotor 13 to engage with rear disk brake calliper 14 in order to provide braking of the rear single side mounted wheel assembly 7. The folding rear single sided cantilevered frame member 35 is formed to receive a folding front frame 36 with a folding latch assembly 37. The folding rear single sided cantilevered frame member 35 is formed to receive a seat post 8.

Figure 12:
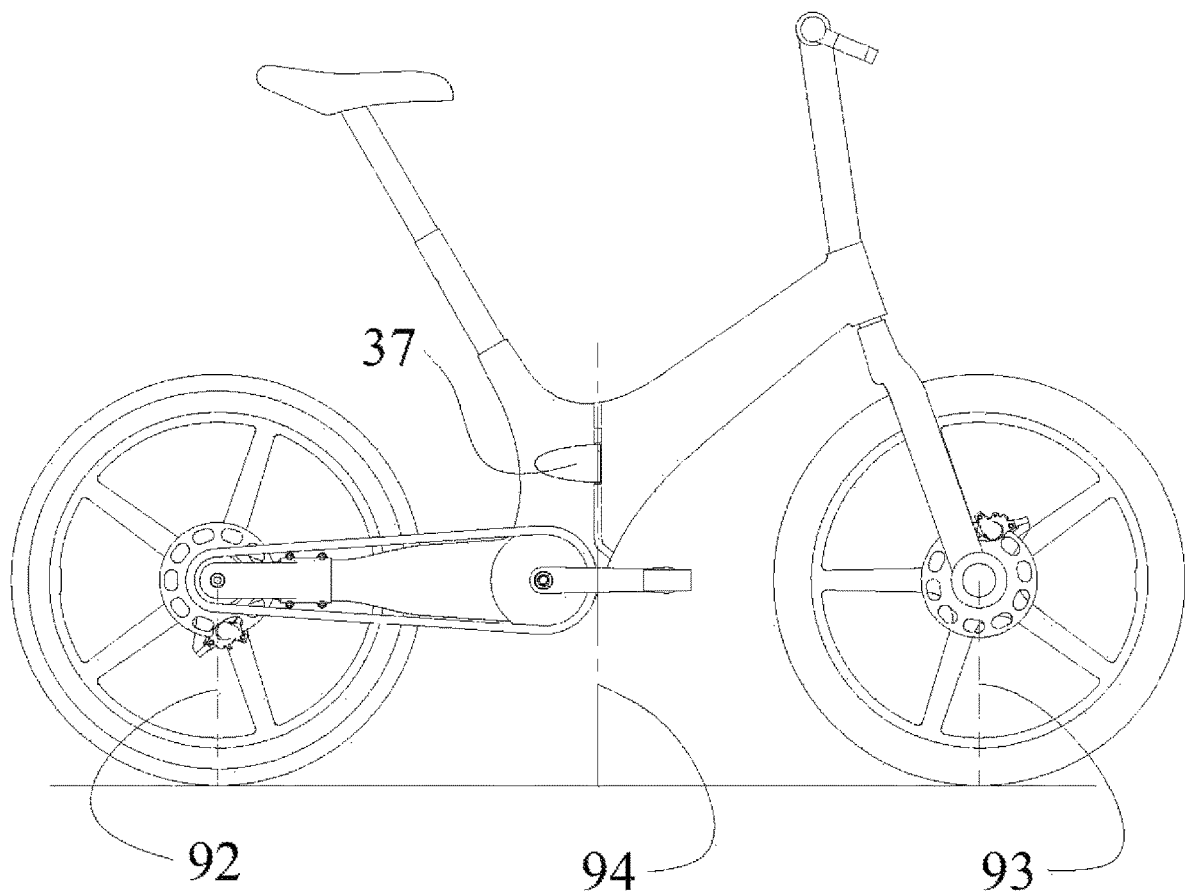
FIG. 12 shows a side view of the embodiment of FIG. 11.

FIG. 12 is a side view of the further alternative embodiment shown in FIG. 11 showing the general position of the folding latch assembly 37 which is located centrally between the rear wheel position 92 and the front wheel position 93 and having a vertical folding hinge axis 94.

Figure 13:
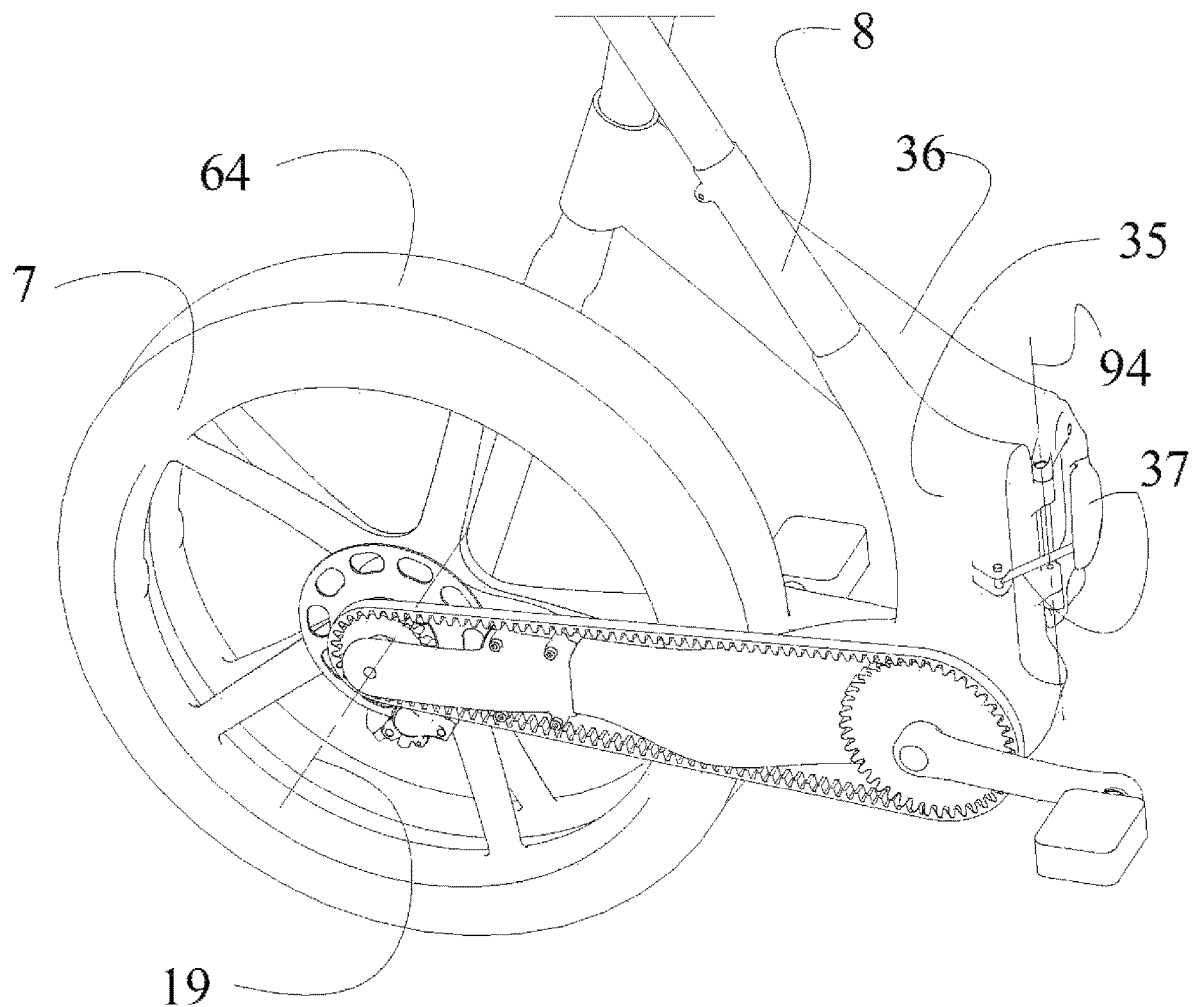
FIG. 13 shows a perspective view of the embodiment of FIG. 11 in a folded state.

FIG. 13 is a perspective side view of the further alternative embodiment shown in FIG. 11 showing the embodiment in a folded configuration. The folding latch assembly 37 is shown in an open configuration such that folding front frame 36 is pivoted around a vertical folding hinge axis 94 relative to the folding rear single sided cantilevered frame member 35 resulting in the rear single side mounted wheel assembly 7 and the front single side mounted wheel assembly 64 being positioned side by side and co-axial with the rear wheel rotation axis 19.

Figure 14:
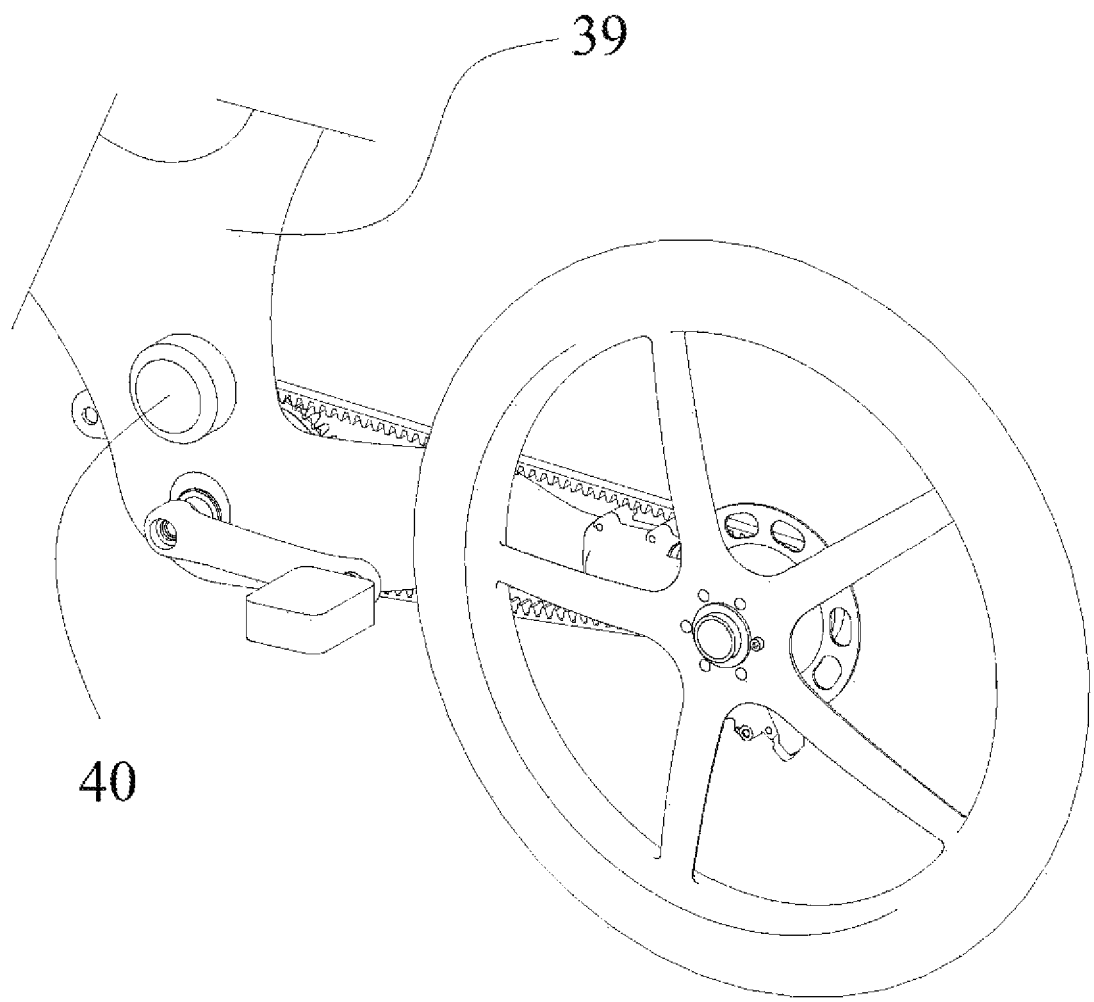
FIG. 14 shows a perspective view of an embodiment of a bicycle with a side mounted belt drive rear wheel frame system fitted with a pedal crank motor assembly.

FIG. 14 is a left side perspective view of a further alternative embodiment comprising a motor rear single sided cantilevered frame member 39 fitted with a pedal crank motor assembly 40 which may be of the well-known and understood electric machine and planetary gear and belt ratio reduction variety. A preferred embodiment of pedal crank motor assembly 40 is shown in FIGS. 15 and 16, however, the nature of pedal crank motor assembly 40 and the nature of the fitting of pedal crank motor assembly 40 to motor rear single sided cantilevered frame member 39 could be of a variety of well-known and understood bicycle pedal crank electric motor drive systems.

Figure 15:
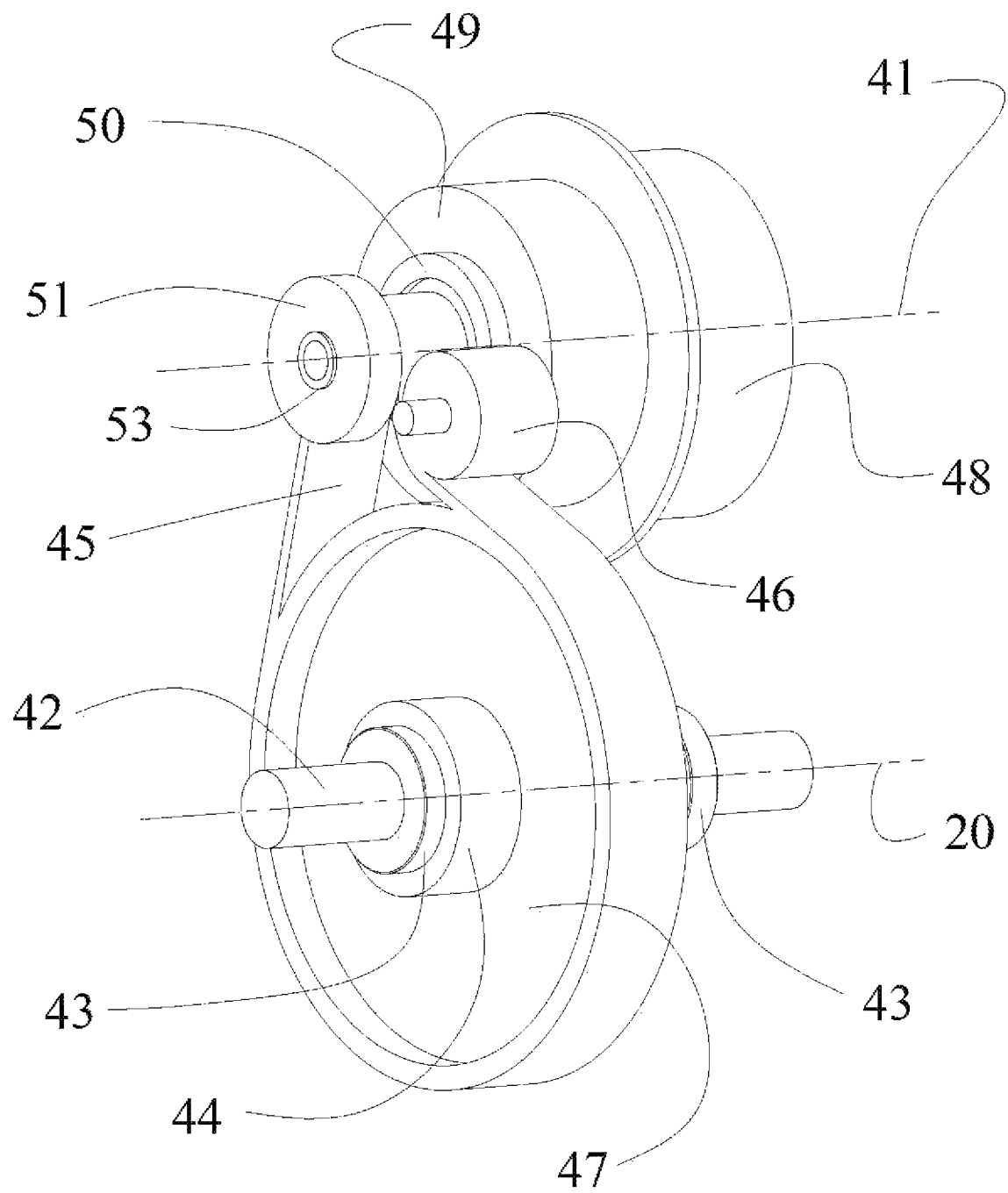
FIG. 15 shows a perspective view of the pedal crank assembly and pedal crank motor of the embodiment shown in FIG. 14.

FIG. 15 is a right side perspective view of the pedal crank motor assembly 40 comprising a pedal crank motor outer housing 48 connected to a pedal crank motor planetary gearbox ring gear housing 49 with a pedal crank motor planet carrier 53 supported rotatably by a pedal crank motor planet carrier shaft output bearing 50 and a pedal crank motor planet carrier shaft end bearing 51. A motor belt 45 is rotatable around pedal crank motor axis 41 and connected to motor belt output sprocket 47 with proper tension controlled by motor belt idler pulley assembly 46. The motor belt output sprocket 47 is connected to a bottom bracket spindle 42 by a bottom bracket one way clutch 44 which may be of the well-known and understood one way sprag type clutch bearing variety such that the bottom bracket spindle 42 can freely and independently rotate relative to the motor belt output sprocket 47 in only one direction. The bottom bracket spindle 42 is rotatable around the pedal crank assembly rotation axis 20 and supported by a bottom bracket bearing 43 on either side of the motor belt output sprocket 47.

Figure 16:
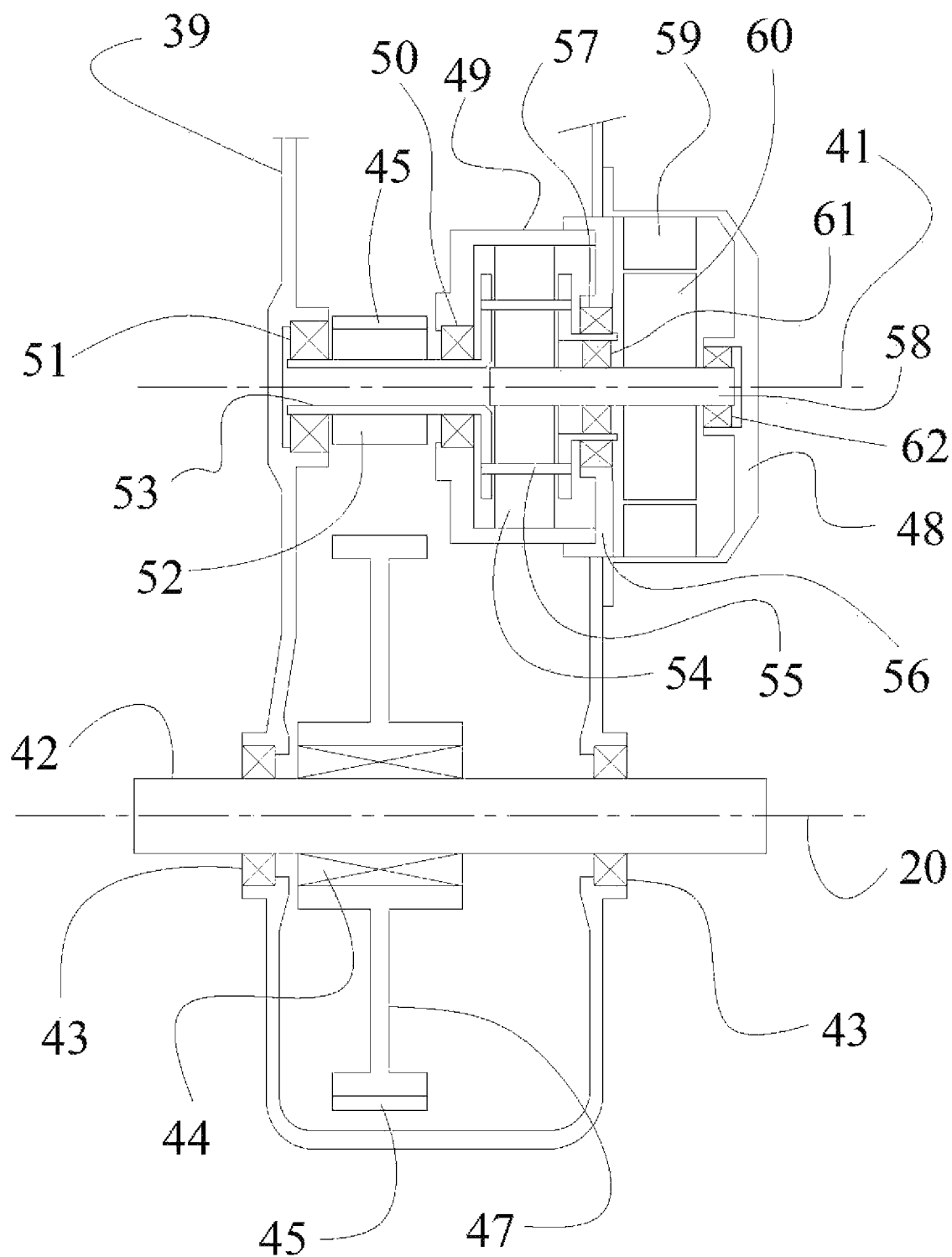
FIG. 16 shows a vertical front cross section view taken through the pedal crank assembly axis and the pedal crank motor axis of the pedal crank motor assembly of FIG. 14.

FIG. 16 is a vertical cross section front view of the pedal crank motor assembly 40 taken through the pedal crank assembly rotation axis 20 and pedal crank motor axis 41. A motor rear single sided cantilevered frame member 39 is formed to receive the pedal crank motor outer housing 48 which contains a pedal crank motor stator 59 and a pedal crank motor pinion outer bearing 62. A pedal crank motor magnet rotary 60 is fitted to the pedal crank motor pinion 58 and rotatably supported by a front motor assembly 63 and a pedal crank motor pinion inner bearing 61 in order to interface with a pedal crank motor planet gear 54. The pedal crank motor planet gear 54 is connected to the pedal crank motor planet carrier 53 by a pedal crank motor planet shaft 55 and interfaces with the pedal crank motor planetary gearbox ring gear housing 49. The interface arrangement of said parts is of the well-known and understood planetary gear reduction variety. The pedal crank motor planet carrier 53 is rotatably supported by the pedal crank motor pinion inner bearing 61 through a pedal crank motor planetary carrier shaft input bearing 57 which is fixed to the pedal crank motor planetary gearbox ring gear housing 49 and by pedal crank motor planet carrier shaft output bearing 50 as well as pedal crank motor planet carrier shaft end bearing 51. Rotational input from the pedal crank motor pinion 58 about the pedal crank motor axis 41 will result in a reduction of rotational speed of pedal crank motor planet carrier 53 of between two and ten to one. The pedal crank motor planet carrier 53 has mounted to it a pedal crank motor belt input sprocket 52 which interfaces with the motor belt 45 which in turn is connected to the motor belt output sprocket 47 providing a further so called second stage of gear reduction of between two and ten to one. The so called second stage of gear reduction could also be of the planetary gear reduction variety. The motor belt output sprocket 47 is connected to the bottom bracket spindle 42 by the bottom bracket one way clutch 44 which may be of the well-known and understood one way sprag type clutch bearing variety such that the bottom bracket spindle 42 can freely and independently rotate relative to the motor belt output sprocket 47 in only one direction. The bottom bracket spindle 42 is rotatable around the pedal crank assembly rotation axis 20 and supported by the bottom bracket bearing 43 on either side of the motor belt output sprocket 47. The motor rear single sided cantilevered frame member 39 is formed to receive bottom bracket bearing 43.

Figure 17:
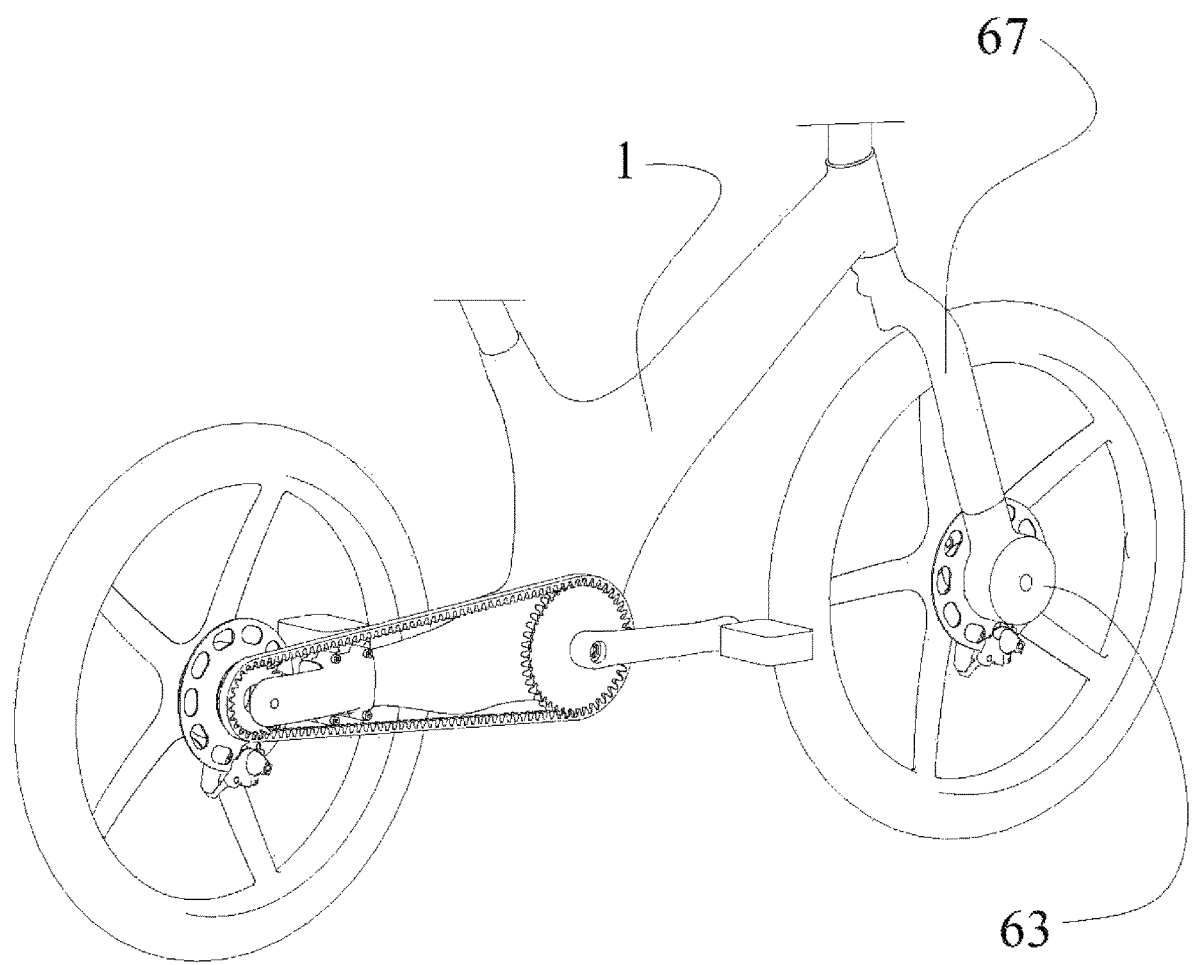
FIG. 17 is a right side perspective view of a further embodiment of a belt driven bicycle with side mounted wheels fitted with a front fork assembly and a front motor assembly; and, FIG. 18 shows a vertical cross section view of the front motor assembly of FIG. 17.

FIG. 17 is a right side perspective view of a further alternative embodiment comprising a belt driven bicycle with side mounted wheels 1 fitted with a front fork assembly 67 and a front motor assembly 63. The front motor assembly 63 may be of the well-known and understood electric machine variety employing a planetary reduction gearing system, having a unique and novel fitting arrangement adapted to support a single side mounted front wheel assembly.

Figure 18:
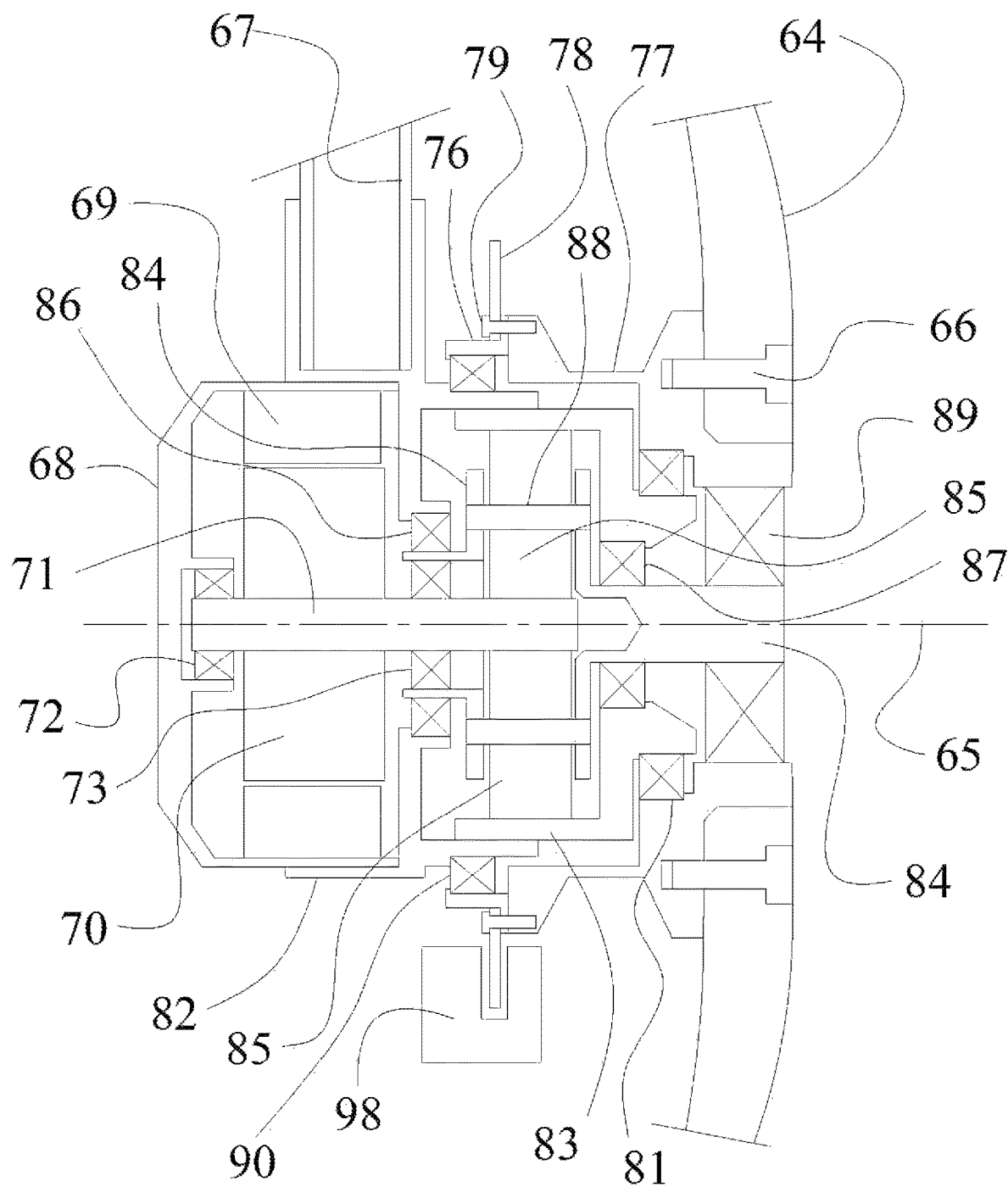

FIG. 18 is a vertical cross section front view of the front motor assembly 63 comprising a front motor planetary gearbox input flange 82 mounted by glue, press fitting, screw or bolt type fastener to front fork assembly 67 able to receive a front motor housing 68. The front motor housing 68 is formed to house a front motor stator 69 and a front motor pinion inner bearing 72 which rotatably supports a front motor pinion 71 which is rigidly attached to a front motor magnet rotary 70. The front motor pinion 71 is rotatably supported by front motor pinion outer bearing 73 which is connected to front motor planet carrier 84 which is rotatably mounted to a front motor planet carrier inner bearing 86 which is housed within a front motor planetary gearbox input flange 82. The front motor planet carrier 84 supports a front motor planet gear shaft 88 and a front motor planet gear 85 in a well-known and understand planetary gear arrangement to mesh with the front motor pinion 71 and front motor planetary gearbox ring gear 83 such that output rotation speed of the front motor planet carrier 84 is reduced by a factor of between two and ten with respect to input rotation speed of the front motor pinion 71. The front motor planet carrier 84 is further rotatably supported by front motor planet carrier outer bearing 87 which is housed within front motor planetary gearbox ring gear 83. The front motor planet carrier 84 is rotatably connected to front wheel hub outer 77 by front motor one way clutch 89 which may be a well-known and understood one way sprag type clutch such that rotation of the front wheel hub outer 77 around the front wheel assembly rotation axis 65 is only possibly in one direction with respect to the front motor planet carrier 84. The front single side mounted wheel assembly 64 is rigidly mounted on one side to the front wheel hub outer 77 with front wheel assembly fastener 66. The front wheel hub outer 77 is rotatably mounted to the front motor planetary gearbox ring gear 83 with front wheel hub outer bearing 81 and rigidly connected to front wheel hub inner 76 with front disk rotor fastener 79 passing through front disk rotor 78. Front wheel hub inner 76 is rotatably mounted to the front motor planetary gearbox input flange 82 by front motor large wheel hub inner bearing 90. Front wheel brake calliper 98 is arranged around front disk rotor 78 in a well-known fashion in order to provide braking force to the front single side mounted wheel assembly 64.

The invention claimed is:

1. A pedal driven cycle comprising:
a cantilevered frame member coupled to a power input sprocket and a driven sprocket;
a belt drive connecting the power input sprocket to the driven sprocket;
a side mounted rear wheel releasably coupled to a multi-speed gear hub that is coaxial with the side mounted rear wheel, wherein the multi-speed gear hub is coupled to the driven sprocket; and
a tension adjustment mechanism coupling the driven sprocket to the cantilevered frame member, the tension adjustment mechanism being slidably moveable along at least a part of the cantilevered frame member thereby to adjust a tension in the belt drive, and comprising a first member and a second member slidably moveable along at least a part of the cantilevered frame member, wherein the first and second members are arranged on opposing sides of the cantilevered frame member and clamped to the cantilevered frame member.

2. The pedal driven cycle of claim 1, wherein at least a portion of the cantilevered frame member is offset from a fore-aft centreline of the pedal driven cycle.

3. The pedal driven cycle of claim 1, further comprising a gear hub housing coupled to the cantilevered frame member retaining the multi-speed gear hub between the rear wheel and the belt drive such that the belt drive is removable without removing the side mounted rear wheel and the side mounted rear wheel is removable without removing or adjusting the belt drive.

4. The pedal driven cycle of claim 3, wherein the multi-speed gear hub is retained in the gear hub housing by one or more bearings.

5. The pedal driven cycle of claim 1, wherein the multi-speed gear hub is a planetary gear hub.

6. The pedal driven cycle of claim 1, further comprising a torque arm for transmitting torque from the multi-speed gear hub to the cantilevered frame member.

7. The pedal driven cycle of claim 1, wherein the tension adjustment mechanism is adjustable by means of one or more adjustment screws.

8. The pedal driven cycle of claim 7, wherein the first member comprises an adjustment screw.

9. The pedal driven cycle of claim 7, wherein the second member comprises an adjustment screw.

10. The pedal driven cycle of claim 1, wherein the first member is the gear hub housing.

11. The pedal driven cycle of claim 1, wherein the second member is the torque arm.

12. The pedal driven cycle of claim 1, wherein the cantilevered frame member comprises slots to receive the tension adjustment mechanism.

13. The pedal driven cycle of claim 1, further comprising an eccentric bottom bracket tension adjustment system.

14. The pedal driven cycle of claim 1, wherein the cantilevered frame member is shaped to curve around the tyre of the side mounted rear wheel.

15. The pedal driven cycle of claim 1, wherein a primary structural load path of the cantilevered frame member is in the plane intersected by the belt drive.

16. The pedal driven cycle of claim 1, wherein a cross sectional area of the cantilevered frame member is greatest in the plane intersected by the belt drive.

17. The pedal driven cycle of claim 16, wherein the cross sectional area of the cantilevered frame member in a plane perpendicular to the fore-aft centreline of the pedal drive cycle is greatest at the point of least clearance to the side mounted rear wheel.

18. The pedal driven cycle of claim 1, wherein a clearance between a tyre of the side mounted rear wheel and the cantilevered frame member is between 2 mm and 15 mm.

19. The pedal driven cycle of claim 1, wherein a clearance between the cantilevered frame member and a pedal crank assembly of the pedal drive cycle is between 2 mm and 15 mm.

20. The pedal driven cycle of claim 1, wherein the cantilevered frame member has a side profile that substantially coincides with a side profile of the belt drive along at least a portion of its length of travel.

21. The pedal driven cycle of claim 20, wherein a clearance between the cantilevered frame member and the belt drive is between 0.5 mm and 12 mm along at least a major portion of a length of travel of the belt drive.

22. The pedal driven cycle of claim 20, wherein the cantilevered frame member comprises a lip protruding in a plane perpendicular to an axis of the side mounted rear wheel, wherein the lip is adjacent to a first side edge of the belt drive.

23. The pedal driven cycle of claim 22, further comprising a second lip protruding in a plane perpendicular to the axis of the side mounted rear wheel, wherein the second lip is adjacent to a second side edge of the belt drive.

24. The pedal driven cycle of claim 1, wherein the cantilevered frame member is pivotally coupled to a forward frame member of the pedal driven cycle.

25. The pedal driven cycle of claim 24 further comprising a springing member connected to the cantilevered frame member and the forward frame member to provide suspension of the rear wheel.

26. The pedal driven cycle of claim 1, wherein the gear hub is arranged to receive a brake rotor.

27. The pedal driven cycle of claim 1, wherein the side mounted rear wheel comprises cantilevered spokes.

28. The pedal driven cycle of claim 27, wherein the cantilevered spokes are formed from a monolithic material.

29. The pedal driven cycle of claim 27, wherein the spokes are curved such that the rim of the side mounted rear wheel is aligned with a centreline of the pedal driven cycle and a hub of the side mounted rear wheel is offset from the centreline of the pedal driven cycle.

30. The pedal driven cycle of claim 27, wherein the spokes are non-triangulated spokes.

31. The pedal driven cycle of claim 1, further comprising a motor able to transmit torque to a pedal crank assembly.

32. The pedal driven cycle of claim 1, further comprising a motor mounted coaxial with a wheel.

33. The pedal driven cycle of claim 32, wherein the motor is mounted coaxial with the front wheel.

34. The pedal driven cycle of claim 1, further comprising a hinge for folding the pedal driven cycle.

35. A pedal driven cycle comprising:
a cantilevered frame member coupled to a power input sprocket and a driven sprocket;
a belt drive connecting the power input sprocket to the driven sprocket;
a side mounted rear wheel releasably coupled to a multi-speed gear hub that is coaxial with the side mounted rear wheel, wherein the multi-speed gear hub is coupled to the driven sprocket;
a tension adjustment mechanism coupling the driven sprocket to the cantilevered frame member, the tension adjustment mechanism being slidably moveable along at least a part of the cantilevered frame member thereby to adjust a tension in the belt drive, and comprising a first member and a second member, wherein the first and second members are arranged on opposing sides of the cantilevered frame member and clamped to the cantilevered frame member; and
a gear hub housing coupled to the cantilevered frame member retaining the multi-speed gear hub between the rear wheel and the belt drive such that the belt drive is removable without removing the side mounted rear wheel and the side mounted rear wheel is removable without removing or adjusting the belt drive.

36. A pedal driven cycle comprising:
a cantilevered frame member coupled to a power input sprocket and a driven sprocket;
a belt drive connecting the power input sprocket to the driven sprocket;
a side mounted rear wheel releasably coupled to a multi-speed gear hub that is coaxial with the side mounted rear wheel, wherein the multi-speed gear hub is coupled to the driven sprocket; and
a tension adjustment mechanism coupling the driven sprocket to the cantilevered frame member, the tension adjustment mechanism being slidably moveable along at least a part of the cantilevered frame member thereby to adjust a tension in the belt drive, and comprising a gear hub housing and a torque arm, wherein the gear hub housing and torque arm are arranged on opposing sides of the cantilevered frame member and clamped to the cantilevered frame member.

\* \* \* \* \*